US012615646B2

(12) United States Patent
Zhang et al.

(10) Patent No.: US 12,615,646 B2
(45) Date of Patent: Apr. 28, 2026

(54) METHOD FOR DETERMINING REFERENCE RESOURCE, FIRST TERMINAL AND STORAGE MEDIUM

(71) Applicant: GUANGDONG OPPO MOBILE TELECOMMUNICATIONS CORP., LTD., Dongguan (CN)

(72) Inventors: Shichang Zhang, Dongguan (CN); Huei-Ming Lin, Taipei (TW); Zhenshan Zhao, Dongguan (CN); Yi Ding, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 349 days.

(21) Appl. No.: 18/386,177

(22) Filed: Nov. 1, 2023

(65) Prior Publication Data

US 2024/0064777 A1 Feb. 22, 2024

Related U.S. Application Data

(63) Continuation of application No. PCT/CN2021/092859, filed on May 10, 2021.

(51) Int. Cl.
H04W 72/25 (2023.01)
H04W 72/044 (2023.01)

(52) U.S. Cl.
CPC ......... H04W 72/25 (2023.01); H04W 72/044 (2013.01)

(58) Field of Classification Search
USPC .... 370/229, 230, 230.1, 235, 252, 311, 328, 370/329, 330, 431, 458, 468
See application file for complete search history.

(56) References Cited

U.S. PATENT DOCUMENTS

2020/0029340 A1* 1/2020 He ...................... H04W 72/044
2020/0314804 A1* 10/2020 Shin ...................... H04L 5/0055
2021/0105104 A1* 4/2021 Cao ...................... H04L 1/1893
(Continued)

FOREIGN PATENT DOCUMENTS

CN 112385251 A 2/2021
CN 112690035 A 4/2021
(Continued)

OTHER PUBLICATIONS

International Search Report in the international application No. PCT/CN2021/092859, mailed on Jan. 17, 2022. 5 pages with English translation.
(Continued)

*Primary Examiner* — Nguyen H Ngo

(74) *Attorney, Agent, or Firm* — BAYES PLLC

(57) ABSTRACT

A method for determining a reference resource includes: a first terminal determines a resource pool where a reference resource set is located, and determines, in a resource selection window, a first resource set belonging to the resource pool; the first terminal excludes resources from the first resource set based on detected Sidelink Control Information (SCI) and a measured Sidelink Reference Signal Received Power (SL-RSRP) to obtain a second resource set, where the second resource set is a resource set adaptable to be used by a second terminal; and the first terminal indicates the second resource set to the second terminal.

18 Claims, 16 Drawing Sheets

The first terminal determines a resource pool where a reference resource set is located, and determines, in a resource selection window, a first resource set belonging to the resource pool — 801

The first terminal excludes resources from the first resource set based on detected SCI and a measured SL-RSRP to obtain at least one of a second resource set or a third resource set, where the second resource set is a resource set adaptable to be used by a second terminal, and the third resource set is a resource set not adaptable to be used by the second terminal — 802

The first terminal indicates at least one of the second resource set or the third resource set to the second terminal — 803

(56) References Cited

U.S. PATENT DOCUMENTS

| | | | |
|---|---|---|---|
| 2022/0030575 A1* | 1/2022 | Farag | H04W 72/02 |
| 2022/0201528 A1 | 6/2022 | Shin et al. | |
| 2023/0224871 A1 | 7/2023 | Ding | |

FOREIGN PATENT DOCUMENTS

| | | |
|---|---|---|
| EP | 4192095 A1 | 6/2023 |
| WO | 2020222532 A1 | 11/2020 |

OTHER PUBLICATIONS

Written Opinion of the International Search Authority in the international application No. PCT/CN2021/092859, mailed on Jan. 17, 2022. 8 pages with English translation.

3GPP TSG RAN WG1 #104b-e R1-2102921, e-Meeting, Apr. 12-20, 2021, Title: Discussion on the inter-UE coordination, Source: ZTE, Sanechips, Agenda item: 8.11.1.2, Document for: Discussion and decision. pp. 1-5. 7 pages.

3GPP TS 38.331 V16.3.1 (Jan. 2021), 3rd Generation Partnership Project; Technical Specification Group Radio Access Network; NR; Radio Resource Control (RRC) protocol specification (Release 16). the whole document. 932 pages.

3GPP TS 38.214 V16.5.0 (Mar. 2021), 3rd Generation Partnership Project; Technical Specification Group Radio Access Network; NR; Physical layer procedures for data (Release 16). the whole document. 171 pages.

Supplementary European Search Report in the European application No. 21941189.9, mailed on Aug. 6, 2024. 19 pages.

Lenovo et al: "Sidelink resource allocation for Reliability enhancement", 3GPP Draft; R1-2005840, 3rd Generation Partnership Project (3GPP), Mobilecompetence Centre; 650, Route Des Lucioles; F-06921 Sophia-Antipolis Cedex; France, vol. RAN WG1, no. E-meeting; Aug. 17-2020-Aug. 28, 2020, Aug. 7, 2020 (Aug. 7, 2020), XP052347213, pp. 1-2. 3 pages.

Qualcomm Incorporated: "Sidelink Resource Allocation Mechanism for NR V2X", 3GPP Draft; R1-1913293, 3rd Generation Partnership Project (3GPP), Mobile Competence Centre; 650, Route Des Lucioles; F-06921 Sophia-Antipolis Cedex; France, vol. RAN WG1, no. Reno, USA; Nov. 18, 2019-Nov. 22, 2019, Nov. 19, 2019 (Nov. 19, 2019), XP051826631, pp. 1-4. 10 pages.

Partial Supplementary European Search Report in the European application No. 21941189.9, mailed on May 7, 2024. 14 pages.

First Office Action of the European application No. 21941189.9, issued on Apr. 3, 2025. 10 pages.

* cited by examiner

100

Base station

Sidelink
communication

Base station

Sidelink
communication

Hidden node

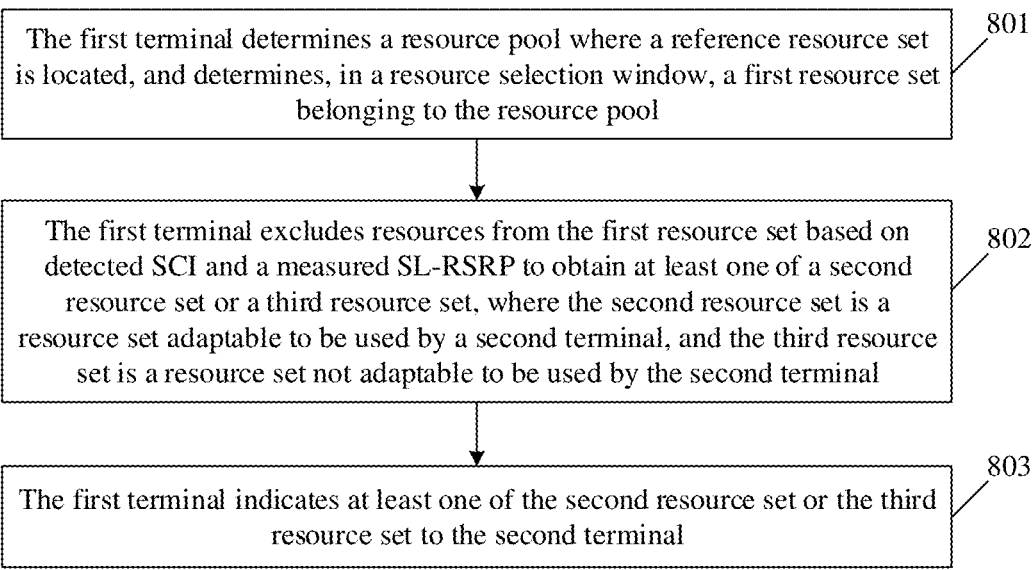

The first terminal determines a resource pool where a reference resource set is located, and determines, in a resource selection window, a first resource set belonging to the resource pool ⟋801

The first terminal excludes resources from the first resource set based on detected SCI and a measured SL-RSRP to obtain at least one of a second resource set or a third resource set, where the second resource set is a resource set adaptable to be used by a second terminal, and the third resource set is a resource set not adaptable to be used by the second terminal ⟋802

The first terminal indicates at least one of the second resource set or the third resource set to the second terminal ⟋803

FIG. 8

METHOD FOR DETERMINING REFERENCE RESOURCE, FIRST TERMINAL AND STORAGE MEDIUM

CROSS-REFERENCE TO RELATED APPLICATION

This application is a continuation of International Application No. PCT/CN2021/092859 filed on May 10, 2021, the disclosure of which is hereby incorporated by reference in its entirety.

BACKGROUND

A Vehicle-To-Everything (V2X) system adopts a mode of terminal-to-terminal direct communication. The 3rd Generation Partnership Project (3GPP) defines two transmission modes: a first transmission mode and a second transmission mode. For the first transmission mode, transmission resources of a terminal are allocated by a base station. For the second transmission mode, the transmission resources of the terminal are autonomously selected by the terminal.

For the second transmission mode, there will be some problems in the process of selecting resources by the terminal. To this end, one terminal can send a reference resource set to the other terminal to assist the other terminal in resource selection. How the terminal determines the reference resource set is an unsolved problem.

SUMMARY

Embodiment of the present disclosure relates to the technical field of mobile communications, and in particular to a method for determining a reference resource, a first terminal and a non-transitory computer-readable storage medium.

The method for determining a reference resource provided by the embodiments of the disclosure includes following three operations. A first terminal determines a resource pool where a reference resource set is located, and determines, in a resource selection window, a first resource set belonging to the resource pool. The first terminal excludes resources from the first resource set based on detected Sidelink Control Information (SCI) and a measured Sidelink Reference Signal Received Power (SL-RSRP) to obtain a second resource set, where the second resource set is a resource set adaptable to be used by a second terminal. The first terminal indicates the second resource set to the second terminal.

The first terminal provided by the embodiments of the disclosure includes a processor, and a memory configured to store computer instructions executable by the processor. The processor is configured to perform operations of: determining a resource pool where a reference resource set is located, and determine, in a resource selection window, a first resource set belonging to the resource pool; excluding resources from the first resource set based on detected Sidelink Control Information (SCI) and a measured Sidelink Reference Signal Received Power (SL-RSRP) to obtain a second resource set, wherein the second resource set is a resource set adaptable to be used by a second terminal; and indicating the second resource set to the second terminal.

The non-transitory computer-readable storage medium provided by the embodiment of the disclosure has stored thereon computer-executable instructions that, when executed by a processor of a first terminal, cause the first terminal to perform operations of: determining a resource pool where a reference resource set is located, and determine, in a resource selection window, a first resource set belonging to the resource pool; excluding resources from the first resource set based on detected Sidelink Control Information (SCI) and a measured Sidelink Reference Signal Received Power (SL-RSRP) to obtain a second resource set, wherein the second resource set is a resource set adaptable to be used by a second terminal; and indicating the second resource set to the second terminal.

BRIEF DESCRIPTION OF THE DRAWINGS

The drawings described herein are adopted to provide a further understanding to the application and form a part of the application. Schematic embodiments of the application and descriptions thereof are adopted to explain the application and not intended to form improper limits to the present disclosure.

FIG. 8 is a flowchart of a method for determining a reference resource according to an embodiment of the present disclosure.

DETAILED DESCRIPTION

The technical schemes of the embodiments of the present disclosure would be clearly and completely described in conjunction with the accompanying drawings in the embodiments of the present disclosure. It is apparent that the described embodiments are only part of the embodiments of the present disclosure, not all the embodiments. All other embodiments obtained by those of ordinary skill in the art based on the embodiments of the present disclosure without creative efforts all fall within the scope of protection of the present disclosure.

The technical scheme of the embodiments of the present disclosure may be applied to various communication systems, such as Long Term Evolution (LTE) system, LTE Frequency Division Duplex (FDD) system, LTE Time Division Duplex (TDD), system, $5^{th}$ generation (5G) communication system or future communication system, etc.

Figure 1:
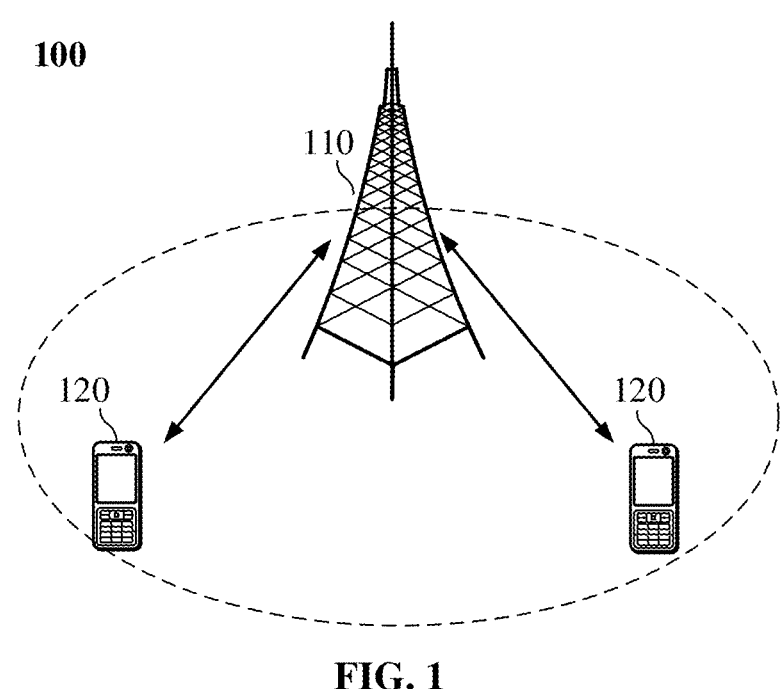
FIG. 1 is a schematic diagram of a communication system architecture according to an embodiment of the present disclosure.

Exemplarily, a communication system 100 applied to the embodiments of the present disclosure is shown in FIG. 1. The communication system 100 may include a network device 110, and the network device 110 may be a device communicating with a terminal device 120 (or called a communication terminal, a terminal). The network device 110 may provide communication coverage for a particular geographical region and may communicate with a terminal device located in the coverage. Optionally, the network device 110 may be a Base Transceiver Station (BTS) in the GSM or the CDMA system, may also be a NB in the WCDMA system, and may further be an eNB or eNodeB in the LTE system or a wireless controller in a Cloud Radio Access Network (CRAN). Or the network device may be a mobile switching center, a relay station, an access point, an in-vehicle device, a wearable device, a hub, a switch, a network bridge, a router, a network-side device in a 5G network, a network device in a future communication system or the like.

The communication system 100 also includes at least one terminal device 120 located within coverage of the network device 110. As used herein, the "terminal device" includes, but is not limited to be connected: via a wired line, such as via a Public Switched Telephone Networks (PSTN), a Digital Subscriber Line (DSL), a digital cable, a direct cable connection; and/or another data connection/network; and/or via a wireless interface, for example, for a cellular network, a Wireless Local Area Network (WLAN), a digital television network such as a DVB-H network, a satellite network, an AM-FM broadcast transmitter; and/or means of another terminal device arranged to receive/transmit communication signals; and/or an Internet of Things (IoT) device. The terminal device configured to communicate through a wireless interface may be referred to as a "radio communication terminal", a "radio terminal" or a "mobile terminal". Examples of the mobile terminal include, but are not limited to: a satellite or cellular telephone; a Personal Communications System (PCS) terminal that may combine a cellular radio telephone with data processing, facsimile, and data communication capabilities; a Personal Digital Assistant (PDA) that may include a radio telephone, a pager, Internet/Intranet access, a Web browser, a notebook, a calendar, and/or a Global Positioning System (GPS) receiver; and conventional laptop and/or palmtop receivers or other electronic devices including radio telephone transceivers. The terminal device may refer to an access terminal, UE, a user unit, a user station, a mobile station, a mobile radio station, a remote station, a remote terminal, a mobile device, a user terminal, a terminal, a radio communication device, a user agent, or a user device. The access terminal may be a cellular telephone, a cordless telephone, a Session Initiation Protocol (SIP) telephone, a Wireless Local Loop (WLL) station, a PDA, a handheld device having a radio communication function, a computing device or other processing device connected to a radio modem, an in-vehicle device, a wearable device, a terminal device in a 5G network, a terminal device in a future evolved Public Land Mobile Network (PLMN), or the like.

Optionally, the terminals 120 may perform Device-to-Device (D2D) direct connection communications.

Optionally, a 5G communication system or 5G network may also be referred to as a New Radio (NR) system or an NR system.

FIG. 1 exemplarily illustrates one network device and two terminals. Optionally, the communication system 100 may include multiple network devices and other numbers of terminals may be included within a coverage of each network device, which are not limited in embodiments of the present disclosure.

Optionally, the communication system 100 may also include other network entities such as network controllers and mobility management entities, which are not limited in embodiments of the present disclosure.

It should be understood that a device having a communication function in a network/system in an embodiment of the present disclosure may be referred to as a communication device. Taking the communication system 100 shown in FIG. 1 as an example, the communication device may include a network device 110 and a terminal 120 each having a communication function, and the network device 110 and the terminal 120 may be specific devices described above and will not be described herein. The communication device may also include other devices in the communication system 100 such as network controllers, mobility management entities and other network entities, which are not limited in embodiments of the present disclosure.

It should be understood that the terms "system" and "network" are often used interchangeably herein. In the present disclosure, the term "and/or" is merely an association relationship that describes associated objects, indicating that there can be three relationships, for example, A and/or B means that there are three situations: A alone, A and B simultaneously, and B alone. In addition, the character "/" in the present disclosure generally indicates that the associated objects have a kind of "or" relationship.

In order to facilitate understanding of the technical scheme of the embodiments of the present disclosure, the technical technology related to the embodiments of the present disclosure are described below, and the following related technologies, as optional schemes, can be arbitrarily combined with the technical schemes of the embodiments of the disclosure, all of which belong to the protection scope of the embodiments of the disclosure.

Sidelink Communication Under Different Network Coverage Environments

Figure 2A:
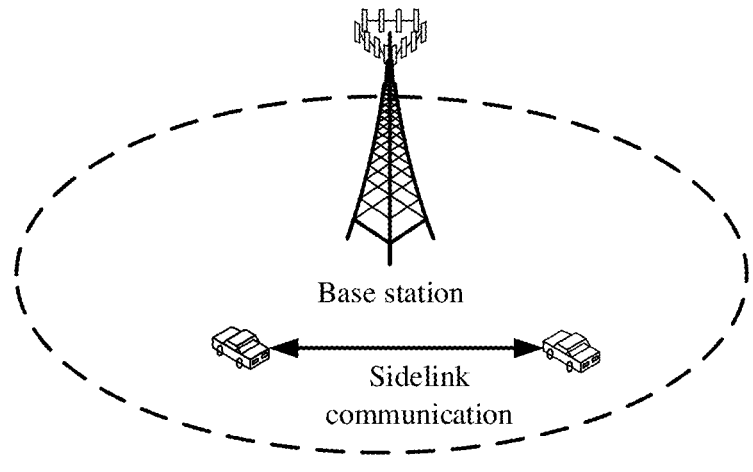
FIG. 2A is a schematic diagram of sidelink communication within a network coverage according to an embodiment of the present disclosure.
Figure 2B:
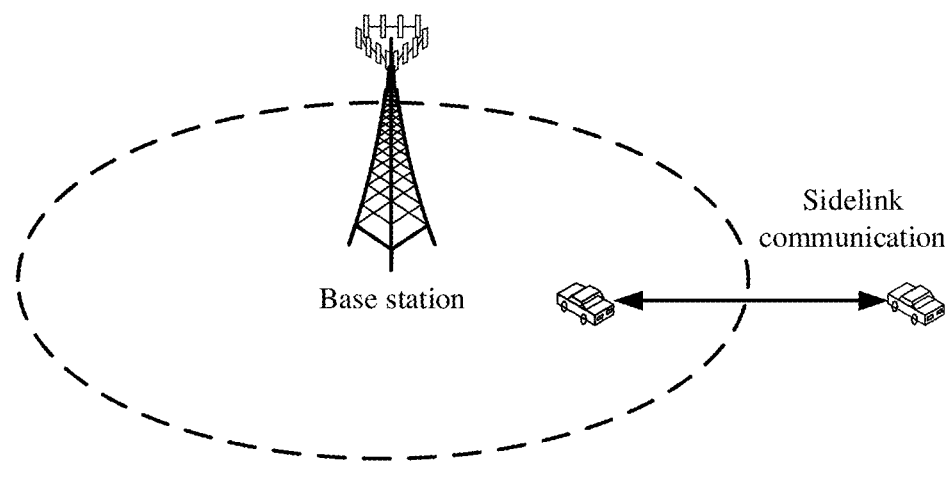
FIG. 2B is a schematic diagram of sidelink communication partly within a network coverage according to an embodiment of the present disclosure.
Figure 2C:
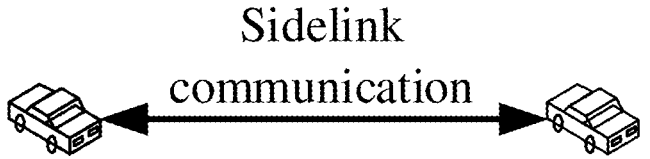
FIG. 2C is a schematic diagrams of sidelink communication outside a network coverage according to an embodiment of the present disclosure.

According to the network coverage situation where a terminal performing the communication is located, the sidelink communication may be divided into the sidelink communication within network coverage, the sidelink communication partly within network coverage and the sidelink communication outside network coverage, as shown in FIG. 2A, FIG. 2B and FIG. 2C respectively.

As shown in FIG. 2A, in the sidelink communication within network coverage, all the terminals performing the sidelink communication are located within the coverage of the same base station, so that all the terminals can perform sidelink communication, based on the same sidelink configuration, by receiving the configuration signaling from the base station.

As shown in FIG. 2B, in the situation of the sidelink communication partly within network coverage, a part of terminals performing sidelink communication are located within the coverage of the base station, and these terminals can receive the configuration signaling from the base station and perform sidelink communication according to the configuration from the base station. Terminals located outside the network coverage cannot receive the configuration signaling from the base station. In this case, the terminals outside the network coverage determine the sidelink configuration according to pre-configuration information and information carried in a Physical Sidelink Broadcast Channel (PSBCH) sent by the terminal located within the network coverage, so as to perform the sidelink communication.

As shown in FIG. 2C, for the sidelink communication outside network coverage, all terminals performing the sidelink communication are located outside the network coverage, and all terminals determine sidelink configuration for sidelink communication according to pre-configuration information.

Resource Selection Modes in the Sidelink Communication

A device-to-device communication is a sidelink transmission technology based on Device to Device (D2D), which is different from the traditional cellular system in which communication data is received or sent by a base station. Therefore, the device-to-device communication has higher spectrum efficiency and lower transmission delay. In the sidelink communication, terminal-to-terminal direct communication is adopted. The 3GPP defines two transmission modes: the first transmission mode and the second transmission mode.

In the first transmission mode, transmission resources of the terminal are allocated by the base station, and the terminal sends data on the sidelink according to the resources allocated by the base station. The base station may allocate, to the terminal, resources for single transmission or semi-static transmission. As shown in FIG. 2A, the terminal is located within the network coverage, and the network allocates the transmission resources for sidelink transmission to the terminal.

In the second transmission mode, the terminal selects, in the resource pool, a resource for data transmission. As shown in FIG. 2C, the terminal is located outside the coverage of the cell, and the terminal autonomously selects transmission resources in a pre-configured resource pool to perform the sidelink transmission. Or, as shown in FIG. 2A, the terminal autonomously selects transmission resources from a resource pool configured by the network to perform the sidelink transmission.

The resource selection in the second transmission mode is performed according to following steps 1 to 2.

In step 1, the terminal takes all available resources in a resource selection window as a resource set A, and the terminal takes remaining resources after resource exclusion in the set A as a candidate resource set.

If the terminal sends data in certain slots within a sensing window and does not perform sensing, all resources in slots corresponding to these certain slots in the resource selection window (which can also be referred to as a selection window for short) are excluded. The terminal determines the slots corresponding to these certain slots in the resource selection window by using a value set of the "resource reservation period" field in its used resource pool configuration.

If a terminal senses a Physical Sidelink Control Channel (PSCCH) in the resource sensing window (which can also be referred to as a sensing window for short), the terminal measures a Reference Signal Received Power (RSRP) of the PSCCH or an RSRP of a Physical Sidelink Shared Channel (PSSCH) scheduled by the PSCCH. If the measured RSRP is greater than an SL-RSRP threshold, and reserved resources determined according to resource reservation information in the SCI transmitted in the PSCCH are in the resource selection window, the reserved resources are excluded from the set A. If a ratio of a number of remaining resources in the resource set A to the total number of resources in the resource set A before the resource exclusion is less than X %, the SL-RSRP threshold is increased by 3 dB, and step 1 is performed again. The possible values of X are {20, 35, 50}, and the terminal determines a parameter X from the value set according to a priority of the data to be sent. Moreover, the SL-RSRP threshold is associated with a priority carried in the PSCCH sensed by the terminal and a priority of the data to be sent by the terminal.

In step 2, the terminal randomly selects multiple resources from the candidate resource set as transmission resources for its initial transmission and retransmission.

It is to be noted that, in the embodiments of the present disclosure, the first transmission mode can also be referred to as the first resource selection mode, and the second transmission mode can also be referred to as the second resource selection mode. The names of the first transmission mode and the second transmission mode are not limited in the technical schemes of the embodiments of the disclosure.

Figure 3:
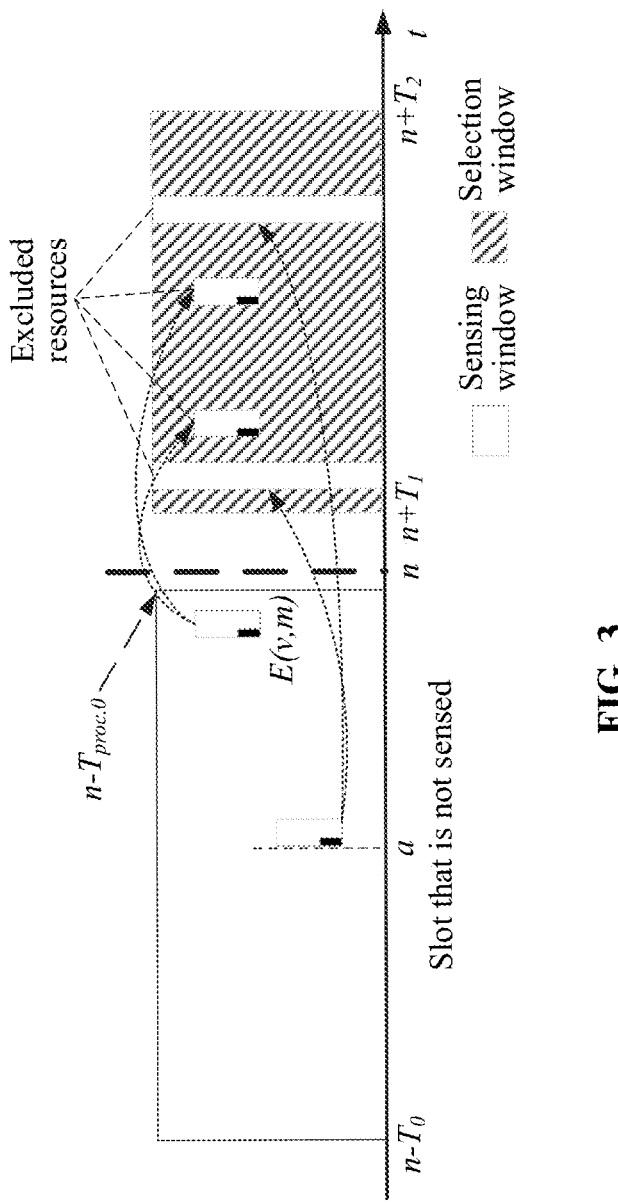
FIG. 3 is a schematic diagram of resource selection corresponding to a second transmission mode according to an embodiment of the present disclosure.

As shown in FIG. 3, the terminal triggers resource selection or resource reselection in a slot n, and the resource selection window starts from n+T1 and ends at n+T2. $0 \leq T1 \leq T_{proc,1}$, when the subcarrier spacings are 15 kHz, 30 kHz, 60 kHz and 120 kHz respectively, $T_{proc,1}$ can be 3 slots, 5 slots, 9 slots and 17 slots respectively. T2 min$\leq$T2$\leq$a residual delay budget of service. A value set of $T2_{min}$ may be {1, 5, 10, 20}*$2^{\mu}$ slots, where $\mu$=0, 1, 2, 3 correspond to cases where the subcarrier spacings are 15 kHz, 30 kHz, 60 kHz and 120 kHz respectively. The terminal may determine $T2_{min}$ from the value set according to the priority of the data to be sent by the terminal. [n+T1, n+T2] is referred to as the resource selection window.

The terminal performs resource sensing from n–T0 to $n-T_{proc,0}$ and T0 is 100 or 1100 milliseconds. When the subcarrier spacings are 15 kHz, 30 kHz, 60 kHz and 120 kHz, respectively, $T_{proc,0}$ can be 1 slot, 1 slot, 2 slots and 4 slots respectively. [n–T0 to $n-T_{proc,0}$] is referred to as a resource sensing window.

The resource selection process in the second transmission mode is performed according to following two steps.

In step 1, the physical layer of the terminal may exclude, according to a channel listening result, resources not adaptable to be used for the sidelink transmission from a resource selection window; and the physical layer of the terminal reports the resource set A subjected to the resource exclusion, as a candidate resource set, to the high layer, i.e., the Media Access Control (MAC) layer of the terminal.

The terminal takes all available resources belonging to the resource pool used by the terminal in the resource selection window as a resource set A, and any one resource in the set A is represented as R(x, y), and x and y indicate a time-domain position and a frequency-domain position of the resource respectively. An initial number of resources in set A is designated as $M_{total}$.

In step 1-1, if the terminal sends data in a slot a within a sensing window and does not perform sensing, the first terminal determines whether a slot a+q*Prx1g overlaps with a resource R(x, y+j*Ptx1g); and if the slot a+q*Prx1g overlaps with the resource R(x, y+j*Ptx1g), the first terminal performs resource exclusion R(x, y) from the resource set A.

Herein, j=0, 1, 2, 3 . . . C−1, and C is determined by a random counter value generated by the terminal; Ptx1g is a number of logical slots converted from a resource reservation period of the terminal Ptx; Prx1g is a number of logical slots converted from Prx, and Prx is any one allowed resource reservation period in the resource pool; and if Prx<Tsca1 and n−m≤Prx1g, Q=[Tsca1/Prx], otherwise, Q=1, where Tsca1 is a value in milliseconds that is converted from T2.

In step 1-2, if the terminal senses SCI transmitted in PSCCH on a v-th frequency domain resource E(v, m) in a slot m within the sensing window, the terminal measures an SL-RSRP of a PSCCH or an SL-RSRP of a PSSCH scheduled by the PSCCH (i.e., the SL-RSRP of the corresponding PSSCH transmitted in the same slot as the PSCCH). If the measured SL-RSRP is greater than the SL-RSRP threshold and reserved resources between transport blocks (TBs) are activated in the resource pool used by the first terminal, the first terminal assumes that the SCI received in a slot m+q*Prx1g has the same content as that received in slot m. Herein, q=1, 2, 3 . . . Q. Prx<Tsca1 and n−m≤Prx1g, Q=[Tsca1/Prx], otherwise, Q=1, where Tsca1 is a value in milliseconds that is converted from T2. Prx1g is a number of logical slots converted from Prx. Prx is a resource reservation period indicated by the "Resource reservation period" field in the SCI transmitted in the PSCCH sensed by the terminal. The terminal may determine whether the resources indicated by the "Time resource assignment" field and the "Frequency resource assignment" field of SCI received in the slot m and Q pieces of the SCI assumed to be received overlap with the resource R(x, y+j*Ptx1g). If the resources overlap with the resource R(x, y+j*Ptx1g), the corresponding resource R(x, y) is excluded from the set A. Herein, j=0, 1, 2, 3 . . . C−1, and C is determined by a random counter value generated by the first terminal; Ptx1g is a number of logical slots converted from Ptx, and Ptx is a resource reservation period determined by the terminal performing the resource selection.

The RSRP threshold is determined by the priority P1 carried in the PSCCH sensed by the terminal and the priority P2 of the data to be sent by the terminal. The configuration of the resource pool used by the terminal includes an SL-RSRP threshold list containing SL-RSRP thresholds corresponding to all priority combinations (P1, P2). The configuration of resource pool can be configured by the network or pre-configured. If the number of the remaining resources in the resource set A subjected to the resource exclusion is less than $M_{total}$*X %, the SL-RSRP threshold is increased by 3 dB, and the step 1 is performed again. The possible values of X are {20, 35, 50}. The configuration of the resource pool used by the terminal includes correspondences between the priorities and the possible values of X, and the terminal determines the value of X according to the priority of the data to be sent and the correspondences.

In step 2, the MAC layer of the terminal randomly selects resources from the reported candidate resource set to send data. That is, the terminal randomly selects resources from the candidate resource set to send data.

Transmission Modes in NR-V2X

In NR-V2X, autonomous driving needs to be supported, so higher requirements are put forward for data interaction between vehicles, such as higher throughput, lower delay, higher reliability, larger coverage and more flexible resource allocation.

Figure 4A:
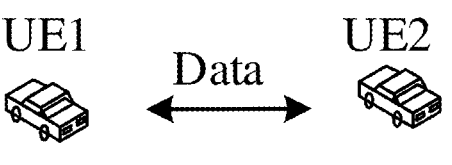
FIG. 4A is a schematic diagram of a unicast transmission mode according to an embodiment of the present disclosure.
Figure 4B:
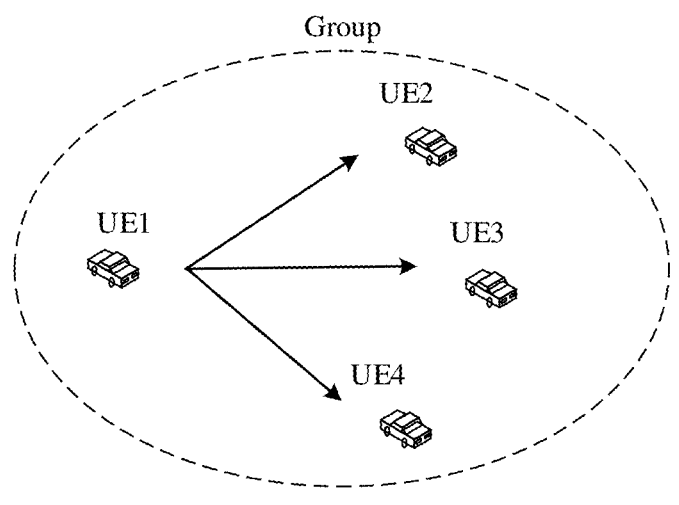
FIG. 4B is a schematic diagram of a multicast transmission mode according to an embodiment of the present disclosure.
Figure 4C:
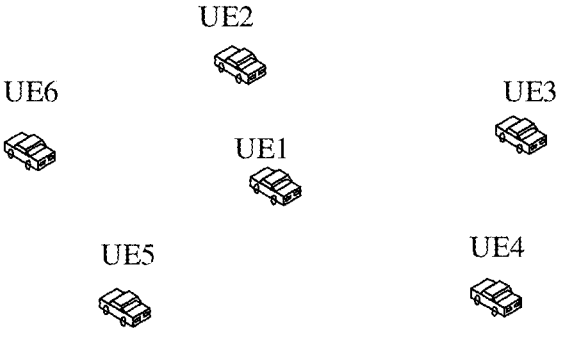
FIG. 4C is a schematic diagram of a broadcast transmission mode according to an embodiment of the present disclosure.

In LTE-V2X, the broadcast transmission mode is supported, and in NR-V2X, the unicast transmission mode and the multicast transmission mode are introduced. For the unicast transmission, there is only one terminal at the receiving end, as shown in FIG. 4A, unicast transmission is performed between UE1 and UE2. For the multicast transmission, the receiving end includes all terminals in a communication group or all terminals within a certain transmission distance. As shown in FIG. 4B, UE1, UE2, UE3 and UE4 form a communication group, in which UE1 sends data, and other terminals in the group are the terminals at the receiving end. For the broadcast transmission mode, the terminal at the receiving end is any one terminal around the terminal at the sending end. As shown in FIG. 4C, UE1 is the terminal at the sending end, and other terminals around UE1, i.e., UE2 to UE6, are all terminals at the receiving end.

Enhanced Resource Allocation in NR-V2X

In the second transmission mode, the terminal randomly selects the transmission resources in the resource pool or selects the transmission resources according to the sensing result. This resource selection mode can avoid the interference between the terminals to a certain extent, but still has problems of hidden node, half-duplex, exposed node and power consumption.

Figure 5:
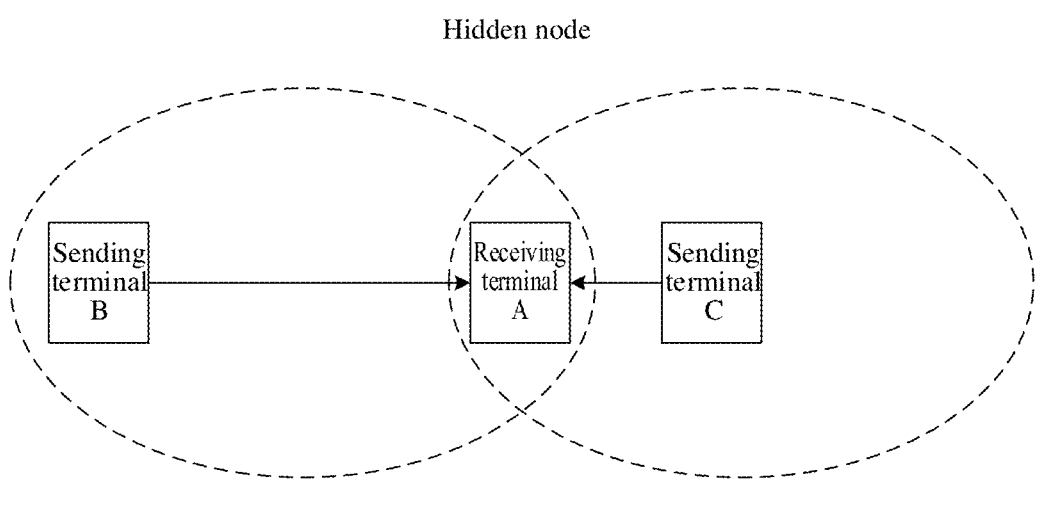
FIG. 5 is a schematic diagram of a hidden terminal according to an embodiment of the present disclosure.

For the problem of hidden node, as shown in FIG. 5, terminal B selects resources according to sensing, and sends sidelink data to terminal A by using these resources. Since terminal B and terminal C are far away from each other and cannot sense each other's transmission. Therefore, the terminal B and the terminal C may select the same transmission resources, and the data sent by the terminal C will cause interference to the data sent by the terminal B, which is the hidden node problem.

For the problem of half-duplex, when a terminal selects transmission resources through sensing, if the terminal sends sidelink data on a certain slot in the sensing window, due to the limitation of the half-duplex, the terminal cannot receive data sent by other terminals and have no sensing result on the certain slot. Therefore, when the terminal excludes resources, the terminal will exclude all resources corresponding to the certain slot in the selection window to avoid interference with other terminals. Due to the limitation of half-duplex, the terminal excludes many resources that do not need to be excluded.

Figure 6:
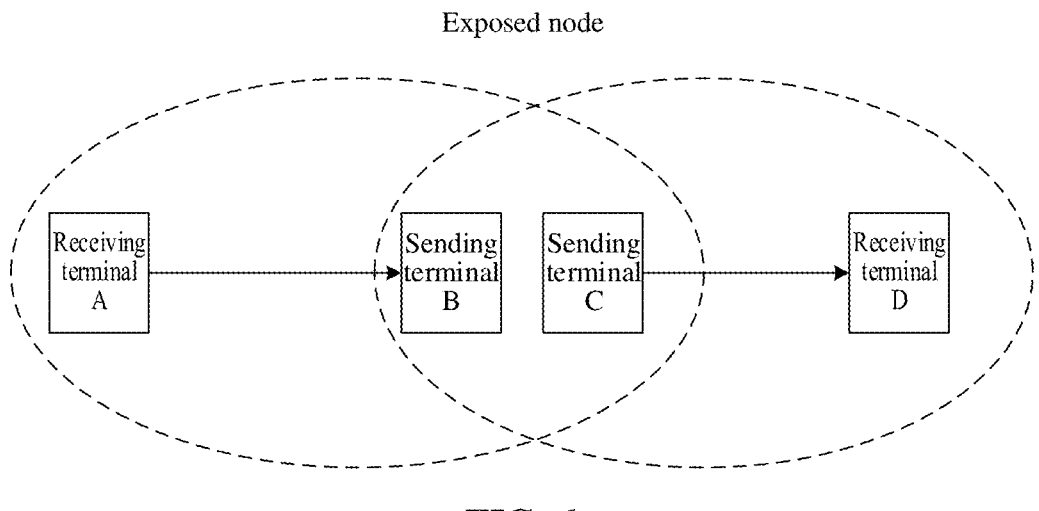
FIG. 6 is a schematic diagram of an exposed terminal according to an embodiment of the present disclosure.

For the problem of exposed node, as shown in FIG. 6, both the sending terminal B and the sending terminal C can monitor each other, but the target receiving terminal A of the sending terminal B is far away from the sending terminal C, and the target receiving terminal D of the sending terminal C is far away from the sending terminal B. In this case, even if the sending terminal B and the sending terminal C use the same time-frequency resources, the receptions of their respective target receiving terminals A and D will not be affected. However, since a geographical position of the terminal B is close to a geographical position of terminal C, the signal received power of one terminal detected by an opposite terminal during the sensing process may be very high. Therefore, the terminals B and C will select orthogonal time-frequency resources, which may eventually lead to the decline of resource utilization efficiency.

For the problem of power consumption, in the sensing process, the terminal needs to continuously sense resources to determine which resources are available, and the terminal needs to consume a lot of energy to continuously sense the resources, which is not a problem for a vehicle-mounted terminal, because the vehicle-mounted terminal is provided with a power supply device; but for a handheld terminal, excessive energy consumption will lead to power off of the terminal soon. Therefore, how to reduce the energy consumption of the terminal is also a problem that needs to be considered in the process of resource selection.

Figure 7:
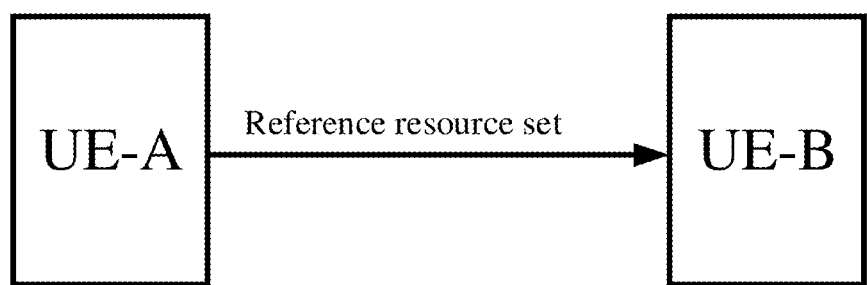
FIG. 7 is a schematic diagram of sidelink resource selection based on resource coordination according to an embodiment of the present disclosure.

Due to the problems in the resource selection process in the second transmission mode, an enhanced resource selection scheme is proposed. On the basis of the resource sensing adopted by the second transmission mode, a reference resource set can also be sent from one terminal (such as UE-A) to another terminal (such as UE-B) to assist the other terminal (such as UE-B) in resource selection, as shown in FIG. 7. The reference resource set may be an available resource set obtained by the UE-A according to a resource sensing result, indication from a base station or the like, or the reference resource set may be determined according to detected SCI. The reference resource set may be a resource set adaptable to be used by the UE-B, and when the UE-B selects resources for sending sidelink data to the target receiving terminal, the resources can be preferentially selected from the available resource set, thereby improving the reliability of receiving the sidelink data by the target receiving terminal. Alternatively, the resource set may also be a resource set not adaptable to be used by the UE-B, and the UE-B avoids selecting the resources in the resource set when selecting the resources, thereby avoiding problems such as hidden node, half-duplex limitation and the like. The terminal undertaking the functions of the UE-A is referred to as a resource coordination terminal.

Compared with the existing second transmission mode in which the terminal autonomously selects the transmission resources, in the resource allocation mode above, the terminal selects the resources in combination with the reference resource set sent by other terminals during the resource selection process, so that the transmission reliability can be improved.

In the above-mentioned sidelink resource selection based on resource coordination, the UE-A needs to determine a resource set adaptable to be used by the UE-B and/or a resource set not adaptable to be used by the UE-B. Herein, the resource set adaptable to be used by the UE-B and/or the resource set not adaptable to be used by the UE-B may also be referred to as the reference resource set. How to determine the reference resource set by the UE-A is an unsolved problem. Therefore, the following technical schemes of the embodiments of the disclosure are proposed. The technical schemes of the embodiments of the disclosure are intended to solve a problem that how a UE-A determines the reference resource set through channel sensing in sidelink resource selection based on resource coordination.

In order to facilitate understanding of the technical scheme of the embodiments of the present disclosure, the technical schemes of the present disclosure will be described in detail below by way of specific embodiments. The above related technologies, as optional schemes, can be arbitrarily combined with the technical schemes of the embodiments of the disclosure, and all of which belong to the protection scope of the embodiments of the present disclosure. Embodiments of the present disclosure include at least part of the following content.

FIG. 8 is a flowchart of a method for determining a reference resource according to an embodiment of the present disclosure. As shown in FIG. 8, the method for determining a reference resource includes following operations 801 to 803.

In operation 801, a first terminal determines a resource pool where a reference resource set is located, and determines, in a resource selection window, a first resource set belonging to the resource pool.

In the embodiment of the present disclosure, the resource pool where the reference resource set is located is one of sending resource pools used by the second terminal.

In some optional implementations, the first terminal determines the resource pool where the reference resource set is located through network configuration, pre-configuration, or indication information sent by the second terminal.

In operation 802, the first terminal excludes resources from the first resource set based on detected SCI and a measured SL-RSRP to obtain at least one of a second resource set or a third resource set, where the second resource set is a resource set adaptable to be used by a second terminal, and the third resource set is a resource set not adaptable to be used by the second terminal.

In the embodiment of the present disclosure, the first terminal determines at least one SL-RSRP threshold, and the SL-RSRP threshold is used by the first terminal to exclude resources. The following describes how the first terminal excludes resources in different cases.

First Case

In the embodiment of the present disclosure, the first terminal determines a first SL-RSRP threshold based on a first parameter and/or a second parameter. The first parameter is a priority of data to be sent by the second terminal; and the second parameter is a priority indicated in SCI received by the first terminal.

In some optional implementations, the first terminal determines, based on the first parameter, an SL-RSRP threshold corresponding to the first parameter from an SL-RSRP threshold list as the first SL-RSRP threshold.

In some optional implementations, the first terminal determines, based on the first parameter and the second parameter, an SL-RSRP threshold corresponding to the first parameter and the second parameter from an SL-RSRP threshold list as the first SL-RSRP threshold.

In some optional implementations, the SL-RSRP threshold list is configured by a network or pre-configured.

In the embodiment of the present disclosure, after the first SL-RSRP threshold is determined, the first terminal may exclude resources from the first resource set by following three steps.

In a first step, the first terminal performs a first exclusion operation on the first resource set.

In a second step, the first terminal performs a second exclusion operation on the first resource set.

In a third step, the first terminal performs a third exclusion operation on the first resource set based on the first SL-RSRP threshold, the detected SCI and the measured SL-RSRP.

After the first step, the second step and the third step are performed, a set of remaining resources is a second resource set, and a set of excluded resources is the third resource set.

Second Case

In the embodiment of the present disclosure, the first terminal determines a first SL-RSRP threshold based on at least one of a decoding capability of the first terminal, a first parameter, or an SL-RSRP of the second terminal measured by the first terminal. The first parameter is a priority of data to be sent by the second terminal.

Herein, optionally, the SL-RSRP of the second terminal measured by the first terminal is an SL-RSRP obtained by the first terminal measuring a last received PSCCH or PSSCH sent by the second terminal.

In some optional implementations, the first terminal selects, based on at least one of the decoding capability of the first terminal or the SL-RSRP of the second terminal measured by the first terminal, an SL-RSRP threshold from an SL-RSRP threshold list as the first SL-RSRP threshold.

In some optional implementations, the first terminal selects, based on at least one of the first parameter or the SL-RSRP of the second terminal measured by the first terminal, an SL-RSRP threshold from an SL-RSRP threshold list as the first SL-RSRP threshold.

In some optional implementations, the SL-RSRP threshold list is configured by a network or pre-configured.

In the embodiment of the present disclosure, after the first SL-RSRP threshold is determined, the first terminal can exclude resources from the first resource set by following three steps.

In a first step, the first terminal performs a first exclusion operation on the first resource set.

In a second step, the first terminal performs a second exclusion operation on the first resource set.

In a third step, the first terminal performs a third exclusion operation on the first resource set based on the first SL-RSRP threshold, the detected SCI and the measured SL-RSRP.

After the first step, the second step and the third step are performed, a set of remaining resources is a second resource set, and a set of excluded resources is the third resource set.

Third Case

The first terminal selects an SL-RSRP threshold having a smallest value from an SL-RSRP threshold list as the first SL-RSRP threshold.

In some optional implementations, the SL-RSRP threshold list is configured by a network or pre-configured.

In the embodiment of the present disclosure, after the first SL-RSRP threshold is determined, the first terminal can exclude resources from the first resource set by following three steps.

In a first step, the first terminal performs a first exclusion operation on the first resource set.

In a second step, the first terminal performs a second exclusion operation on the first resource set.

In a third step, the first terminal performs a third exclusion operation on the first resource set based on the first SL-RSRP threshold, the detected SCI and the measured SL-RSRP.

After the first step, the second step and the third step are performed, a set of remaining resources is a second resource set, and a set of excluded resources is the third resource set.

Fourth Case

The first terminal determines the first SL-RSRP threshold according to any one of the first case to the fourth case. After the first SL-RSRP threshold is determined, the first terminal can exclude resources from the first resource set by following three steps.

In a first step, the first terminal performs a first exclusion operation on the first resource set.

In a second step, the first terminal performs a second exclusion operation on the first resource set.

In a third step, the first terminal performs a third exclusion operation on the first resource set based on a second SL-RSRP threshold, the detected SCI and the measured SL-RSRP, where the second SL-RSRP threshold is determined based on the first SL-RSRP threshold. Specifically, the second SL-RSRP threshold is identical to the first SL-RSRP threshold.

After the first step, the second step and the third step are performed, in response to a ratio of a number of resources in a set of remaining resources to a total number of resources in the first resource set being less than X %, the first terminal updates the first SL-RSRP threshold in the third step and performs the third step repeatedly until the ratio is not less than X %; and after a last execution of the third step, the set of remaining resources is the second resource set, and a set of excluded resources is the third resource set.

Herein, the operation that the first terminal updates the first SL-RSRP threshold in the third step includes: the first terminal increases the first SL-RSRP threshold by a specified value. As an example, the specified value is, for example, 2 dB or 3 dB.

In the above scheme, optionally, the first terminal determines a value of X based on network configuration, pre-configuration, or indication information sent by the second terminal.

Fifth Case

The first terminal determines the first SL-RSRP threshold according to any one of the first case to the third case. After the first SL-RSRP threshold is determined, the first terminal can exclude resources from the first resource set by following three steps.

In a first step, the first terminal performs a first exclusion operation on the first resource set.

In a second step, the first terminal performs a second exclusion operation on the first resource set.

In a third step, the first terminal performs a third exclusion operation on the first resource set based on the second SL-RSRP threshold, the detected SCI and the measured SL-RSRP. The second SL-RSRP threshold is determined based on the first SL-RSRP threshold. Specifically, the second SL-RSRP threshold is min (thi, R), where thi is the first SL-RSRP threshold; and R=SL-RSRP_UE-B/min_SINR, where SL-RSRP_UE-B is an SL-RSRP of the second terminal measured by the first terminal, and min_SINR is a minimum Signal and Interference to Noise Ratio (SINR) required by the first terminal to successfully decode PSCCH or PSSCH sent by the second terminal. Optionally, the first terminal determines the min_SINR based on network configuration, pre-configuration, or a decoding capability of the first terminal.

After the first step, the second step and the third step are performed, in response to a ratio of a number of resources in a set of remaining resources to a total number of resources in the first resource set being less than X %, the first terminal updates the first SL-RSRP threshold in the third step and performs the third step repeatedly until the ratio is not less than X %; and after a last execution of the third step, the set of remaining resources is the second resource set, and a set of excluded resources is the third resource set.

Herein, the operation that the first terminal updates the first SL-RSRP threshold in the third step includes: the first terminal increases the first SL-RSRP threshold by a specified value. As an example, the specified value is, for example, 2 dB or 3 dB.

In the above scheme, optionally, the first terminal determines a value of X based on network configuration, pre-configuration, or indication information sent by the second terminal.

Sixth Case

The first terminal determines the first SL-RSRP threshold according to any one of the first case to the third case. After the first SL-RSRP threshold is determined, the first terminal can exclude resources from the first resource set by following three steps.

In a first step, the first terminal performs a first exclusion operation on the first resource set.

In a second step, the first terminal performs a second exclusion operation on the first resource set.

In a third step, the first terminal performs a third exclusion operation on the first resource set based on the first SL-RSRP threshold, the detected SCI and the measured SL-RSRP.

After the first step, the second step and the third step are performed, a set of remaining resources is a first subset, and a set of excluded resources is a second subset; the first terminal updates the first SL-RSRP threshold in the third step, replaces the first resource set in the third step with the second subset, and then performs the third step repeatedly until a number of times of updating the first SL-RSRP threshold reach N−1 times, where N is a positive integer greater than 1; execution times of the third step are N times, one first subset and one second subset are obtained each time the third step is performed, and N first subsets and N second subsets are obtained after the third step is performed N times, where an union of the N first subsets is the second resource set, and a second subset obtained after the third step is performed for an N-th time is the third resource set.

In the embodiment of the present disclosure, the first terminal determines N SL-RSRP thresholds based on the first SL-RSRP threshold, where the N SL-RSRP thresholds are sorted from small to large. After the third step is performed for a k-th time, the first terminal updates the first SL-RSRP threshold to a k-th SL-RSRP threshold among the N SL-RSRP thresholds, where k is a positive integer greater than or equal to 1 and less than or equal to N.

In some optional implementations, the first terminal increases the first SL-RSRP threshold by N−1 different values respectively, to obtain N SL-RSRP thresholds including the first SL-RSRP threshold.

As an example, the N−1 different values are 2 dB, 2*2 dB, . . . , (N−1)*2 dB respectively.

As an example, the N−1 different values are 3 dB, 2*3 dB, . . . , (N−1)*3 dB respectively.

Seventh Case

The first terminal determines the first SL-RSRP threshold according to any one of the first case to the third case. After the first SL-RSRP threshold is determined, the first terminal can exclude resources from the first resource set by following three steps.

In a first step, the first terminal performs a first exclusion operation on the first resource set.

In a second step, the first terminal performs a second exclusion operation on the first resource set.

In a third step, the first terminal performs a third exclusion operation on the first resource set based on the first SL-RSRP threshold, the detected SCI and the measured SL-RSRP.

After the first step, the second step and the third step are performed, a set of remaining resources is a first subset, and a set of excluded resources is a second subset; the first terminal updates the first SL-RSRP threshold in the third step, replaces the first resource set in the third step with the second subset, and then performs the third step repeatedly until a number of times of updating the first SL-RSRP threshold reach N−1 times, where N is a positive integer greater than 1; execution times of the third step are N times, one first subset and one second subset are obtained each time the third step is performed, and N first subsets and N second subsets are obtained after the third step is performed N times, where an union of the N first subsets is the second resource set, and a second subset obtained after the third step is performed for an N-th time is the third resource set.

In the embodiment of the present disclosure, the first terminal determines N SL-RSRP thresholds based on the first SL-RSRP threshold, where the N SL-RSRP thresholds are sorted from small to large. After the third step is performed for a k-th time, the first terminal updates the first SL-RSRP threshold to a k-th SL-RSRP threshold among the N SL-RSRP thresholds, where k is a positive integer greater than or equal to 1 and less than or equal to N.

In some optional implementations, the first terminal determines, based on N decoding success rates, N SL-RSRP thresholds corresponding to the N decoding success rates. Herein, optionally, the first terminal determines the N decoding success rates based on network configuration, pre-configuration, or indication information sent by the second terminal.

In some optional implementations, the first terminal determines the N SL-RSRP thresholds corresponding to the N decoding success rates based on at least one of a decoding capability of the first terminal or an SL-RSRP of the second terminal measured by the first terminal.

The first exclusion operation, the second exclusion operation and the third exclusion operation described in any one of the first case to the third case will be described below.
First Exclusion Operation Any one resource in the first resource set is represented as R(x, y), and x and y indicate a time-domain position and a frequency-domain position of the resource respectively. The first exclusion operation includes following operation.

In response to the first terminal sending data in a slot a within a sensing window and not performing sensing in the slot a, the first terminal determines whether a slot a+q*Prx1g overlaps with a resource R(x, y+j*Ptx1g); and in response to the slot a+q*Prx1g overlapping with the resource R(x, y+j*Ptx1g), the first terminal performs resource exclusion R(x, y) from the first resource set.

Herein, j=0, 1, 2, 3 . . . C−1, and C is determined by a random value generated by the first terminal; Ptx1g is a number of logical slots converted from Ptx, and Ptx is a resource reservation period of the first terminal; Prx1g is a number of logical slots converted from Prx, and Prx is any one allowed resource reservation period in the resource pool; q=1, 2, 3 . . . Q, and if Prx<Tsca1 and n−m≤Prx1g, Q=[Tsca1/Prx], otherwise, Q=1, where Tsca1 is a value in milliseconds that is converted from T2, T2 is an upper limit of the resource selection window, n is a slot number corresponding to a time-domain position where the first terminal triggers resource selection or resource reselection, and m is a slot number corresponding to a time-domain position where the first terminal senses PSCCH.
Second Exclusion Operation Any one resource in the first resource set is represented as R(x, y), and x and y indicate a time-domain position and a frequency-domain position of the resource respectively. The second exclusion operation includes following operation.

in response to the first terminal having reserved resources or selected resources in a slot b, the first terminal determines whether a slot b+q*Prx1g overlaps with a resource R(x, y+j*Ptx1g); and in response to the slot b+q*Prx1g overlaps with a resource R(x, y+j*Ptx1g), the first terminal performs resource exclusion R(x, y) from the first resource set.

Herein, j=0, 1, 2, 3 . . . C−1, and C is determined by a random value generated by the first terminal; Ptx1g is a number of logical slots converted from Ptx, and Ptx is a resource reservation period of the first terminal; Prx1g is a number of logical slots converted from Prx, and Prx is any one allowed resource reservation period in the resource pool; q=1, 2, 3 . . . Q, and if Prx<Tsca1 and n−m≤Prx1g, Q=[Tsca1/Prx], otherwise, Q=1, where Tsca1 is a value in milliseconds that is converted from T2, T2 is an upper limit of the resource selection window, n is a slot number corresponding to a time-domain position where the first terminal triggers resource selection or resource reselection, and m is a slot number corresponding to a time-domain position where the first terminal senses PSCCH.

Third Exclusion Operation

Any one resource in the first resource set is represented as $R(x, y)$, and x and y indicate a time-domain position and a frequency-domain position of the resource respectively. The third exclusion operation includes following operation.

In response to the first terminal sensing SCI sent by a terminal, other than the second terminal, on a v-th frequency domain resource $E(v, m)$ in a slot m within the sensing window, the first terminal measures an SL-RSRP of a PSCCH carrying the SCI or an SL-RSRP of a PSSCH scheduled by the SCI.

In response to the measured SL-RSRP being greater than the SL-RSRP threshold and reserved resources between Transport Blocks (TBs) being activated in the resource pool, the first terminal assumes that the SCI has been received in a slot $m+q*Prx1g$, where $Prx1g$ is a number of logical slots converted from Prx, and Prx is a resource reservation period indicated in the SCI transmitted in the PSCCH sensed by the first terminal; $q=1, 2, 3 . . . Q$, and if $Prx<Tsca1$ and $n-m≤Prx1g$, $Q=[Tsca1/Prx]$, otherwise, $Q=1$, where Tsca1 is a value in milliseconds that is converted from T2, T2 is an upper limit of the resource selection window, n is a slot number corresponding to a time-domain position where the first terminal triggers resource selection or resource reselection, and m is a slot number corresponding to a time-domain position where the first terminal senses PSCCH.

The first terminal determines whether Q pieces of SCI assumed to have been received include at least one piece of SCI indicating a resource that overlaps with the resource $R(x, y+j*Ptx1g)$, in response to the Q pieces of SCI including the at least one piece of SCI, the first terminal excludes the resource $R(x, y)$ from the first resource set, where $j=0, 1, 2, 3 . . . C-1$, and C is determined by a random value generated by the first terminal; $Ptx1g$ is a number of logical slots converted from the Ptx, and Ptx is a resource reservation period of the second terminal.

In some optional implementations, the resource reservation period of the second terminal is indicated by the second terminal to the first terminal.

In some optional implementations, the first terminal determines whether the received SCI is from a terminal other than the second terminal as follows.

In response to an 8-bit source Identity (ID) carried in second-stage SCI associated with the SCI received by the first terminal being different from a lowest 8 bits of a source ID of the second terminal, the first terminal determines that the received SCI is from a terminal other than the second terminal. Optionally, the lowest 8 bits of the source ID of the second terminal are indicated by the second terminal to the first terminal.

In operation 803, the first terminal indicates at least one of the second resource set or the third resource set to the second terminal.

In some optional implementations, the first terminal sends a bitmap to the second terminal, where the bitmap is used for indicating at least one of the second resource set or the third resource set.

In some optional implementations, one or more bits at one or more particular locations in the bitmap correspond to a particular resource in the first resource set, and values of the one or more bits are used for indicating whether the resource corresponding to the one or more bits belongs to the second resource set, belongs to a particular subset of the second resource set or belongs to the third resource set.

Herein, a length of the bitmap is associated with a total number of resources contained in the first resource set and a total number of sets indicated by the first terminal to the second terminal, the total number of the sets including a number of subsets contained in the second resource set and a number of the third resource sets.

In some optional implementations, the length of the bitmap is $L=G*CEIL(log 2(H-1))$, where G is the total number of resources contained in the first resource set, and H is the total number of sets indicated by the first terminal to the second terminal.

The technical schemes of the embodiments of the present disclosure are elaborated in combination with specific application examples. It is to be noted that in the following application examples are described with the first terminal being UE-A for example, and the second terminal being UE-B for example.

In sidelink resource selection based on resource coordination, the UE-A determines the reference resource set to be indicated to the UE-B according to the following three steps.

In step 1, UE-A determines a resource pool R where a reference resource set is located.

In the present disclosure, the resource pool R where the reference resource set is located should be one of the sensing resource pools used by the UE-B. In some embodiments, the UE-A determines the resource pool R where the reference resource set is located through network configuration, pre-configuration, or indication information of the UE-B.

In step 2, the UE-A excludes resources from a resource set belonging to the resource pool R in the resource selection window based on detected SCI and a measured SL-RSRP. After resource exclusion, the set of remaining resources is a set Sr, the set of excluded resources is a set Se, where Sr can represent a resource set adaptable to be used by the UE-B, and Se can represent a resource set not adaptable to be used by the UE-B.

In step 3, the UE-A indicates the set Sr and/or the set Se to UE-B.

The step 2 may be implemented as described in following six different embodiments.

First Embodiment

The UE-A determines an SL-RSRP threshold based on pj and/or pi, and then excludes resources based on the SL-RSRP threshold, so that the SL-RSRP threshold is not increased to ensure a resource ratio. Herein, pj represents a priority of the data to be sent by the UE-B side, and pi represents a priority indicated in the SCI received by the UE-A.

A) According to a first implementation of the present embodiment, the UE-A determines, according to pj, an SL-RSRP threshold th1 from the SL-RSRP threshold list that is configured by the network or pre-configured, the th1 being for excluding resources from the resource selection window. Herein, pj is the priority of the data to be sent by the UE-B side, and before the UE-A performs the operations related to the present disclosure, the UE-B may indicate pj to the UE-A through sidelink signaling.

Herein, if the UE-A determines the relevant configuration of the sidelink communication through the network configuration, the UE-A determines the SL-RSRP threshold list by receiving network configuration signaling. Otherwise, the UE-A determines the SL-RSRP threshold list through the pre-configuration.

For example, the UE-A may determine the SL-RSRP threshold list according to the parameter sl-ThresPSSCH-RSRP-List-r17 in the network configuration signaling or pre-configuration signaling. The parameter sl-ThresPSSCH-RSRP-List-r17 is an additional configuration parameter for the resource pool R, i.e. the parameter sl-ThresPSSCH-RSRP-List-r17 is different from the parameter sl-ThresPSSCH-RSRP-List-r16 in the resource pool R. Each value in the list corresponds to a value of pj.

B) According to a second implementation of the present embodiment, the UE-A determines, according to pi and pj, the SL-RSRP threshold th1 from the SL-RSRP threshold list that is configured by the network or pre-configured, the th1 being for excluding resources from the resource selection window. Herein, pi is the priority indicated in the SCI received by the UE-A, pj is the priority of the data to be sent by the UE-B side, and before the UE-A performs the operations related to the present disclosure, the UE-B may indicate pj to the UE-A through sidelink signaling.

Herein, if the UE-A determines the relevant configuration of the sidelink communication through the network configuration, the UE-A determines the SL-RSRP threshold list by receiving the network configuration signaling. Otherwise, the UE-A determines the SL-RSRP threshold list through the pre-configuration.

For example, the UE-A may determine the SL-RSRP threshold list according to the parameter sl-ThresPSSCH-RSRP-List-r17 in the network configuration signaling or pre-configuration signaling. The parameter sl-ThresPSSCH-RSRP-List-r17 is an additional configuration parameter for the resource pool R, i.e. the parameter sl-ThresPSSCH-RSRP-List-r17 is different from the parameter sl-ThresPSSCH-RSRP-List-r16 in the resource pool R. The i-th value in the list corresponds to the combination (pi, pj), where $i=pi+(pj-1)*8$.

It is assumed that the resource set contained in the resource selection window is a set A, the UE-A performs resource exclusion according to following steps a1 to c1.

In step a1, in response to the UE-A sending data in a slot a within a sensing window and do not performing sensing in the slot a, the UE-A determines whether a slot $a+q*Prx1g$ overlaps with a resource $R(x, y+j*Ptx1g)$; and in response to the slot $a+q*Prx1g$ overlapping with the resource $R(x, y+j*Ptx1g)$, the UE-A performs resource exclusion $R(x, y)$ from the first resource set. Herein, $j=0, 1, 2, 3 \ldots C-1$, and C is determined by a random counter value generated by the first terminal; Ptx1g is a number of logical slots converted from Ptx that is a resource reservation period of the UE-A; Prx1g is a number of logical slots converted from Prx, and Prx is any one allowed resource reservation period in the resource pool; $q=1, 2, 3 \ldots Q$, and if $Prx<Tsca1$ and $n-m \leq Prx1g$, $Q=[Tsca1/Prx]$, otherwise, $Q=1$, where Tsca1 is a value in milliseconds that is converted from T2, T2 is an upper limit of the resource selection window.

In step b1, in response to the UE-A having reserved resources or selected resources in a slot b, the UE-A determines whether a slot $b+q*Prx1g$ overlaps with a resource $R(x, y+j*Ptx1g)$; and in response to the slot $b+q*Prx1g$ overlaps with a resource $R(x, y+j*Ptx1g)$, the UE-A performs resource exclusion $R(x, y)$ from the first resource set.

In step c1, in response to the UE-A sensing SCI sent by a terminal, other than the second terminal, on a v-th frequency domain resource $E(v, m)$ in a slot m within the sensing window, the UE-A measures an SL-RSRP of a PSCCH carrying the SCI or an SL-RSRP of a PSSCH scheduled by the SCI (i.e., the SL-RSRP of a corresponding PSSCH sent in the same slot as the PSCCH carrying the SCI). In response to the measured SL-RSRP being greater than the th1 and reserved resources between TBs being activated in the resource pool, the UE-A assumes that the SCI received in a slot $m+q*Prx1g$ has the same content as that received in slot m. Prx1g is a number of logical slots converted from Prx, and Prx is a resource reservation period indicated by the "Resource reservation period" in the SCI transmitted in the PSCCH sensed by the UE-A. The terminal may determine whether the resources indicated by the "Time resource assignment" field and the "Frequency resource assignment" field of SCI received in the slot m and Q pieces of the SCI assumed to be received overlap with the resource $R(x, y+j*Ptx1g)$. If the resources overlap with the resource $R(x, y+j*Ptx1g)$, the corresponding resource $R(x, y)$ is excluded from the set A. Herein, $j=0, 1, 2, 3 \ldots C-1$, and C is determined by a random counter value generated by the first terminal; Ptx1g is a number of logical slots converted from Ptx, and Ptx is a resource reservation period. Optionally, the UE-A determines the resource reservation period by receiving the indication information sent by the UE-B.

Optionally, in response to an 8-bit source Identity (ID) carried in second-stage SCI (i.e., SCI format 2-A or SCI format 2-B) associated with the SCI received by the UE-A being different from a lowest 8 bits of a source ID of the UE-B, the UE-A determines that the received SCI is from a terminal other than the UE-B. Optionally, the UE-A may determine the lowest 8 bits of the source ID of the UE-B by receiving the indication information of the UE-B.

The UE-A denotes the set of remaining resources in set A as set Sr, and denotes the set of excluded resources as set Se. Herein, the set Sr may represent a resource set adaptable to be used by the UE-B and the set Se may represent a resource set not adaptable to be used by the UE-B.

Second Embodiment

The UE-A determines an SL-RSRP threshold for excluding resources, according to decoding capability of the UE-A and/or the SL-RSRP of the UE-B measured by the UE-A.

Optionally, the SL-RSRP of the UE-B measured by the UE-A is the SL-RSRP measured by the UE-A according to the last received PSCCH or PSSCH from the UE-B.

In this embodiment, the UE-A determines an SL-RSRP threshold th2, and the UE-A may determine the SL-RSRP threshold according to the implementation of the UE-A and/or the SL-RSRP of the UE-B measured by the UE-A. The UE-A may determine different SL-RSRP thresholds for different pj. For example, the UE-A may select a value from $\{-128$ dBm, $-126$ dBm, $-124$ dBm, $\ldots, 2$ dBm$\}$ as the SL-RSRP threshold according to the decoding capability of the UE-A and/or the SL-RSRP of the UE-B measured by the UE-A. In this case, the SL-RSRP threshold selected for the larger SL-RSRP of the UE-B may be larger. Alternatively, for different values of pj and/or the SL-RSRPs of UE-B measured by the UE-A, the UE-A selects different values from $\{-128$ dBm, $-126$ dBm, $-124$ dBm, $\ldots, 2$ dBm$\}$ as the SL-RSRP threshold. In this case, the SL-RSRP threshold selected by the UE-A may be larger for larger pj (corresponding to lower absolute priority) and for the larger SL-RSRP of the UE-B, the selected SL-RSRP threshold may be larger. In this way, the UE-A can exclude a resource with higher SL-RSRP in the resource exclusion process, so that when the UE-B uses the resource, the receiving SINR of the UE-A can guarantee a specific decoding success rate.

It is assumed that the resource set contained in the resource selection window is set A, the UE-A performs resource exclusion according to following steps a2 to c2.

The step a2 is the same as step a1.

The step b2 is the same as step b1.

The step c2 is the same as step c1, but th1 should be replaced with th2.

The UE-A denotes the set of remaining resources in set A as set Sr and the set of excluded resources as set Se. Herein, the set Sr may represent a resource set adaptable to be used by the UE-B and the set Se may represent a resource set not adaptable to be used by the UE-B.

Third Embodiment

The UE-A determines an SL-RSRP threshold based on at least one of: pj, pi, the decoding capability of the UE-A or the SL-RSRP of the UE-B measured by the UE-A, or the UE-A sets the initial SL-RSRP threshold as a minimum value in the SL-RSRP threshold list and increases the SL-RSRP threshold to ensure the proportion of remaining resources.

A) According to a first implementation of the present embodiment, the UE-A determines, according to pj, the initial SL-RSRP threshold thi from the SL-RSRP threshold list that is configured by the network or pre-configured, the thi being for excluding resources from the resource selection window. Herein, pj is the priority of the data to be sent by the UE-B side, and before the UE-A performs the operations related to the present disclosure, the UE-B may indicate pj to the UE-A through sidelink signaling. Ifif the UE-A determines the relevant configuration of the sidelink communication through the network configuration, the UE-A determines the SL-RSRP threshold list by receiving network configuration signaling. Otherwise, the UE-A determines the SL-RSRP threshold list through the pre-configuration. For example, the UE-A may determine the SL-RSRP threshold list according to the parameter sl-ThresPSSCH-RSRP-List-r17 in the network configuration signaling or pre-configuration signaling. The parameter sl-ThresPSSCH-RSRP-List-r17 is an additional configuration parameter for the resource pool R, i.e. the parameter sl-ThresPSSCH-RSRP-List-r17 is different from the parameter sl-ThresPSSCH-RSRP-List-r16 in the resource pool R. Each value in the list corresponds to a value of pj.

B) According to a second implementation of the present embodiment, the UE-A determines, according to pi and pj, the initial SL-RSRP threshold thi from the SL-RSRP threshold list that is configured by the network or pre-configured, the thi being for excluding resources from the resource selection window. Herein, pi is the priority indicated in the SCI received by the UE-A, pj is the priority of the data to be sent by the UE-B side, and before the UE-A performs the operations related to the present disclosure, the UE-B may indicate pj to the UE-A through sidelink signaling. If the UE-A determines the relevant configuration of the sidelink communication through the network configuration, the UE-A determines the SL-RSRP threshold list by receiving the network configuration signaling. Otherwise, the UE-A determines the SL-RSRP threshold list through the pre-configuration. For example, the UE-A may determine the SL-RSRP threshold list according to the parameter sl-ThresPSSCH-RSRP-List-r17 in the network configuration signaling or pre-configuration signaling. The parameter sl-ThresPSSCH-RSRP-List-r17 is an additional configuration parameter for the resource pool R, i.e. the parameter sl-ThresPSSCH-RSRP-List-r17 is different from the parameter sl-ThresPSSCH-RSRP-List-r16 in the resource pool R. The i-th value in the list corresponds to the combination (pi, pj), where i=pi+(pj−1)*8.

C) According to a third implementation of the present embodiment, the UE-A sets the initial SL-RSRP threshold thi as the minimum value in the SL-RSRP threshold list that is configured by the network or pre-configured. For example, the initial SL-RSRP threshold thi is set as the minimum value configured for sl-ThresPSSCH-RSRP-List-r17.

D) According to a fourth implementation of the present embodiment, the UE-A selects, according to its implementation, a value from the SL-RSRP threshold list that is configured by the network or pre-configured as the initial SL-RSRP threshold thi. For example, the UE-A selects, according to the decoding capability of the UE-A and/or the SL-RSRP of the UE-B measured by the UE-A, a value from the parameter sl-ThresPSSCH-RSRP-List-r17 as the initial SL-RSRP threshold thi.

E) According to a fifth implementation of the present embodiment, the UE-A may determine the SL-RSRP threshold according to the implementation of the UE-A and/or the SL-RSRP of the UE-B measured by the UE-A. The UE-A may determine different SL-RSRP thresholds for different pj. For example, the UE-A may select a value from {−128 dBm, −126 dBm, −124 dBm, . . . , 2 dBm} as the SL-RSRP threshold according to the decoding capability of the UE-A and/or the SL-RSRP of the UE-B measured by the UE-A. In this case, the SL-RSRP threshold selected for the larger SL-RSRP of the UE-B may be larger. Alternatively, for different values of pj and/or the SL-RSRPs of UE-B measured by the UE-A, the UE-A selects different values from {−128 dBm, −126 dBm, −124 dBm, . . . , 2 dBm} as the SL-RSRP thresholds. In this case, the SL-RSRP threshold selected by the UE-A may be larger for larger pj (corresponding to lower absolute priority); and for the larger SL-RSRP of the UE-B, the selected SL-RSRP threshold may be larger.

It is assumed that the resource set contained in the resource selection window is set A, according to an implementation of the present embodiment, the UE-A performs resource exclusion according to following steps a3 to d3.

The step a3 is the same as step a1.

The step b3 is the same as step b1.

The step c3 is the same as step c1, but th1 should be replaced by thi.

In step d3, if a ratio of a number of remaining resources to a total number of resources in the first resource set is less than X %, the terminal increases thi by 2 dB and performs step c3 repeatedly until the ratio is not less than X %.

Optionally, the UE-A may determine a value of X based on network configuration, pre-configuration, or indication information from the UE-B. For example, the UE-A may determine the value of X by receiving the indication information from the UE-B, where the UE-B may select the value of X from 20, 35 and 50.

It is assumed that the resource set contained in the resource selection window is set A, according to another implementation of the present embodiment, the UE-A excludes resources according to following steps a3 to d3.

The step a3 is the same as step a1.

The step b3 is the same as step b1

The step c3 is the same as step c1, but th1 should be replaced by min (thi, R), R=SL-RSRP_UE-B/min_SINR, where SL-RSRP_UE-B is an SL-RSRP of the UE-B measured by the UE-A, and min_SINR is a minimum Signal and Interference to Noise Ratio (SINR) required by the UE-A to successfully decode PSCCH or PSSCH sent by the UE-B. The UE-A determines the min_SINR according to network configuration, pre-configuration, or a decoding capability of the first terminal.

In step d3, if a ratio of a number of remaining resources to a total number of resources in the first resource set is less than X % and the thi is not greater than R, the terminal increases the thi by 2 dB and performs step c3 repeatedly until the ratio is not less than X % or the thi is not greater than R.

Optionally, the UE-A may determine a value of X based on network configuration, pre-configuration, or indication information from the UE-B. For example, the UE-A may determine the value of X by receiving the indication information from the UE-B, where the UE-B may select the value of X from 20, 35 and 50.

The UE-A denotes the set of remaining resources in set A as set Sr, and denotes the set of excluded resources as set Se. Herein, the set Sr may represent a resource set adaptable to be used by the UE-B and the set Se may represent a resource set not adaptable to be used by the UE-B.

Fourth Embodiment

The UE-A determines an SL-RSRP threshold based on at least one of: pj, pi, the decoding capability of the UE-A or the SL-RSRP of the UE-B measured by the UE-A, and the UE-A increases the initial SL-RSRP threshold for N−1 times.

In this embodiment, the UE-A determines the initial SL-RSRP threshold thi according to any one of the implementations A) to E) in the third embodiment, and the UE-A increases the thi by 2 dB for N−1 times, then the UE-A excludes resources according to N SL-RSRP thresholds, and reports the resource subsets obtained after each resource exclusion to the UE-B respectively.

Specifically, it is assumed that the resource set contained in the resource selection window is set A, the UE-A performs resource exclusion according to following steps a4 to c4.

The step a4 is the same as step a1.

The step b4 is the same as step b1.

In the step c4, the UE-A performs step c1 on the set A, replaces th1 with thi, denotes the set of remaining resources as a set Sr_0, and denotes the resources excluded in this step c as a set Se_0.

The UE-A performs step c1 on the set Se_0 again, replaces th1 with thi+2 dB, denotes the set of remaining resources as a set Sr_1, and denotes the resources excluded in this step c as a set Se_1.

The UE-A performs step c1 on the set Se_1 again, and replaces th1 with thi+2*2 dB, and denotes the set of remaining resources as a set Sr_2, and denotes the resources excluded in this step c as a set Se_2.

The above is repeated until the set of remaining resources Sr_N−1 and the set of excluded resources Se_N−1 are obtained.

The UE-A denotes an union of sets Sr_0, . . . and Sr_N−1 as the set Sr, and denotes the set Se_N−1 as the set Se. Herein, the set Sr may represent a resource set adaptable to be used by the UE-B and the set Se may represent a resource set not adaptable to be used by the UE-B.

Fifth Embodiment

The UE-A determines, based on N decoding success rates, N SL-RSRP thresholds corresponding to the N decoding success rates, where N≥1.

In this embodiment, the UE-A firstly determines N decoding success rate thresholds, which may be configured by the network, or pre-configured or indicated by the UE-B. For example, the value of N may be 3, and the decoding success rate thresholds may be 99%, 95% and 90%, respectively.

For different decoding success rates, the UE-A further determines SL-RSRP thresholds corresponding to the decoding success rates. In some embodiments, the UE-A determines the SL-RSRP threshold corresponding to each decoding success rate according to the decoding capability of the UE-A and/or the SL-RSRP of the UE-B measured by the UE-A. The N SL-RSRP thresholds are denoted as th_0, th_1, th_N−1 from small to large.

It is assumed that the resource set contained in the resource selection window is set A, the UE-A performs resource exclusion according to following steps a5 to c5.

The step a5 is the same as step a1.

The step b5 is the same as step b1.

In the step c5, the UE-A performs step c1 on the set A, replaces th1 with th_0, denotes the set of remaining resources as a set Sr_0, and denotes the resources excluded in this step c as a set Se_0.

The UE-A performs step c on the set Se0 again, replaces th1 with th_1, denotes the set of remaining resources as a set Sr_1, and denotes the resources excluded in this step c as a set Se_1.

The UE-A performs step c on the set Se_1 again, replaces th1 with th2, denotes the set of remaining resources as a set Sr_2, and denotes the resources excluded in this step c as a set Se_2.

The above is repeated until the set of remaining resources Sr_N−1 and the excluded resource set Se_N−1 are obtained.

The UE-A denotes an union of sets Sr_0, . . . and Sr_N−1 as the set Sr, and denotes the set Se_N−1 as the set Se. Herein, the set Sr may represent a resource set adaptable to be used by the UE-B and the set Se may represent a resource set not adaptable to be used by the UE-B.

The step 3 may be implemented by the following different embodiments.

Sixth Embodiment

The UE-A may indicate Sr and/or Se to the UE-B through a bitmap with a certain length, and one or more bits at particular location(s) in the bitmap correspond to a particular resource in the set A, optionally, correspond to a particular resource in the set Sr and/or the set Se.

Figure 9:
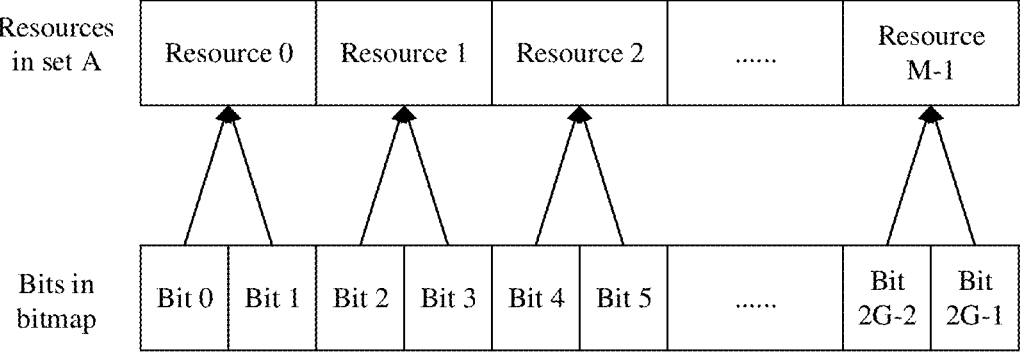
FIG. 9 is a schematic diagram of showing a correspondence relationship between bits in bit positions and resources in Set A according to an embodiment of the present disclosure.

Optionally, the length of the bitmap is associated with a total number of resources contained in the set A, and a total number of subsets contained in the resource set that is adaptable and/or not adaptable to be used by UE-B reported by the UE-A. As an example, the length of the bitmap is L=G*CEIL(log 2(H−1)), where G is the total number of resources in set A and H is the number of subsets contained in the resource set that is adaptable and/or not adaptable to be used by UE-B reported by the UE-A. For example, it is assumed that the total number of resources in set A is G, and the resource set Sr that UE-A needs to report and that is adaptable to be used by UE-B is a union of three subsets, the length of the bitmap is 2*G bits, where every two bits in the bitmap correspond to one resource in the set A, as shown in FIG. 9. For one or more bits corresponding to one resource in the bitmap, different values of the one or more bits indicate that the resource belongs to different resource sets. For example, in the above example, it is assumed that the set Sr is the union of the sets Sr_0, Sr_1, and Sr_2, then 11 represents that the corresponding resource belongs to the set Sr_0, 10 represents that the corresponding resource belongs to the set Sr_1, 01 represents that the corresponding resource belongs to the set Sr_2, and 00 represents that the corresponding resource does not belong to the set Sr, i.e., belongs to the set Se.

The technical scheme of the embodiments of the disclosure provides a method for a terminal to determine a reference resource set in a sidelink resource selection based on coordination between terminals. According to the method provided by the embodiments of the present disclosure, the terminal firstly determines the resource pool where the reference resource set is located; furthermore, the terminal excludes resources from the resource selection window according to the detected SCI and the measured SL-RSRP; and the SL-RSRP threshold used by the terminal during the resource exclusion can be one or more. If the terminal uses one SL-RSRP threshold, the terminal may determine the SL-RSRP threshold for the resource exclusion according to the decoding capability of the terminal or determine the SL-RSRP threshold according to the proportion of remaining resources. If the terminal uses multiple SL-RSRP thresholds, the terminal may firstly determine an initial SL-RSRP threshold, and then the initial SL-RSRP threshold is incremented by 2 dB for multiple times to obtain multiple SL-RSRP thresholds, or the terminal may determine multiple SL-RSRP thresholds according to multiple target decoding success rates. Finally, the terminal reports the determined one or more resource sets to an opposite terminal. According to the method of the embodiment of the disclosure, it is possible to effectively reduce the influence of resource selection based on coordination between terminals on existing terminals, and ensure the validity of the reference resource set determined by the terminal.

Figure 10:
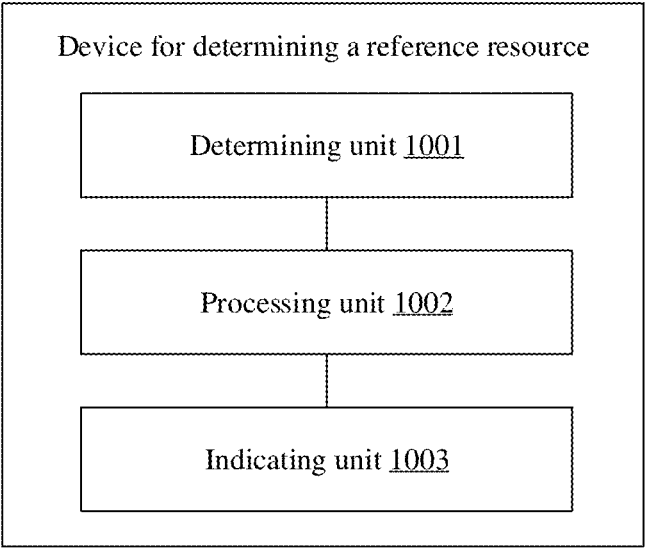
FIG. 10 is a schematic structural diagram of a device for determining a reference resource according to an embodiment of the present disclosure.

FIG. 10 is a schematic structural diagram of a device for determining a reference resource according to an embodiment of the present disclosure, which is applied to a first terminal. As shown in FIG. 10, the device for determining a reference resource includes a determining unit 1001, a processing unit 1002 and an indicating unit 1003.

The determining unit 1001 is configured to determine a resource pool where a reference resource set is located, and determine, in a resource selection window, a first resource set belonging to the resource pool.

The processing unit 1002 is configured to exclude resources from the first resource set based on detected SCI and a measured SL-RSRP to obtain at least one of a second resource set or a third resource set, where the second resource set is a resource set adaptable to be used by a second terminal, and the third resource set is a resource set not adaptable to be used by the second terminal.

The indicating unit 1003 is configured to indicate at least one of the second resource set or the third resource set to the second terminal.

In some optional implementations, the determining unit 1001 is further configured to determine at least one SL-RSRP threshold, where the at least one SL-RSRP threshold is used by the first terminal to exclude the resources.

In some optional implementations, the determining unit 1001 is configured to determine a first SL-RSRP threshold based on at least one of a first parameter or a second parameter The first parameter is a priority of data to be sent by the second terminal, and the second parameter is a priority indicated in SCI received by the first terminal.

In some optional implementations, the determining unit 1001 is configured to determine, based on the first parameter, an SL-RSRP threshold corresponding to the first parameter from an SL-RSRP threshold list as the first SL-RSRP threshold.

In some optional implementations, the determining unit 1001 is configured to determine, based on the first parameter and the second parameter, an SL-RSRP threshold corresponding to the first parameter and the second parameter from an SL-RSRP threshold list as the first SL-RSRP threshold.

In some optional implementations, the determining unit 1001 is configured to determine a first SL-RSRP threshold based on at least one of a decoding capability of the first terminal, a first parameter, or an SL-RSRP of the second terminal measured by the first terminal.

The first parameter is a priority of data to be sent by the second terminal.

In some optional implementations, the determining unit 1001 is configured to select, based on at least one of the decoding capability of the first terminal or the SL-RSRP of the second terminal measured by the first terminal, an SL-RSRP threshold from an SL-RSRP threshold list as the first SL-RSRP threshold.

In some optional implementations, the determining unit 1001 is configured to select, based on at least one of the first parameter or the SL-RSRP of the second terminal measured by the first terminal, an SL-RSRP threshold from an SL-RSRP threshold list as the first SL-RSRP threshold.

In some optional implementations, the SL-RSRP of the second terminal measured by the first terminal is an SL-RSRP obtained by the first terminal measuring a last received PSCCH or PSSCH sent by the second terminal.

In some optional implementations, the determining unit 1001 is configured to select an SL-RSRP threshold having a smallest value from an SL-RSRP threshold list as the first SL-RSRP threshold.

In some optional implementations, the SL-RSRP threshold list is configured by a network or pre-configured.

In some optional implementations, the processing unit 1002 is configured to perform following three steps.

In a first step, the first terminal performs a first exclusion operation on the first resource set.

In a second step, the first terminal performs a second exclusion operation on the first resource set.

In a third step, the first terminal performs a third exclusion operation on the first resource set based on the first SL-RSRP threshold, the detected SCI and the measured SL-RSRP.

After the first step, the second step and the third step are performed, a set of remaining resources is a second resource set, and a set of excluded resources is the third resource set.

In some optional implementations, the processing unit 1002 is configured to perform following three steps.

In a first step, the first terminal performs a first exclusion operation on the first resource set.

In a second step, the first terminal performs a second exclusion operation on the first resource set.

In a third step, the first terminal performs a third exclusion operation on the first resource set based on a second SL-RSRP threshold, the detected SCI and the measured SL-RSRP, where the second SL-RSRP threshold is determined based on the first SL-RSRP threshold.

After the first step, the second step and the third step are performed, in response to a ratio of a number of resources in a set of remaining resources to a total number of resources in the first resource set being less than X %, the first terminal updates the first SL-RSRP threshold in the third step and performs the third step repeatedly until the ratio is not less than X %; and after a last execution of the third step, the set of remaining resources is the second resource set, and a set of excluded resources is the third resource set.

In some optional implementations, the second SL-RSRP threshold is identical to the first SL-RSRP threshold.

In some optional implementations, the second SL-RSRP threshold is min (thi, R), where thi is the first SL-RSRP threshold; and R=SL-RSRP_UE-B/min_SINR, where SL-RSRP_UE-B is an SL-RSRP of the second terminal measured by the first terminal, and min_SINR is a minimum SINR required by the first terminal to successfully decode PSCCH or PSSCH sent by the second terminal.

In some optional implementations, the determining unit 1001 is further configured to determine the min_SINR based on network configuration, pre-configuration, or a decoding capability of the first terminal.

In some optional implementations, the processing unit 1002 is configured to increase the first SL-RSRP threshold by a specified value.

In some optional implementations, the determining unit 1001 is further configured to determine a value of X based on network configuration, pre-configuration, or indication information sent by the second terminal.

In some optional implementations, the processing unit 1002 is configured to perform following three steps.

In a first step, the first terminal performs a first exclusion operation on the first resource set.

In a second step, the first terminal performs a second exclusion operation on the first resource set.

In a third step, the first terminal performs a third exclusion operation on the first resource set based on the first SL-RSRP threshold, the detected SCI and the measured SL-RSRP.

After the first step, the second step and the third step are performed, a set of remaining resources is a first subset, and a set of excluded resources is a second subset; the first terminal updates the first SL-RSRP threshold in the third step, replaces the first resource set in the third step with the second subset, and then performs the third step repeatedly until a number of times of updating the first SL-RSRP threshold reach N−1 times, where N is a positive integer greater than 1; execution times of the third step are N times, one first subset and one second subset are obtained each time the third step is performed, and N first subsets and N second subsets are obtained after the third step is performed N times, where an union of the N first subsets is the second resource set, and a second subset obtained after the third step is performed for an N-th time is the third resource set.

In some optional implementations, the determining unit 1001 is further configured to determine N SL-RSRP thresholds based on the first SL-RSRP threshold, where the N SL-RSRP thresholds are sorted from small to large.

The processing unit is configured to, after the third step is performed for a k-th time, update the first SL-RSRP threshold to a k-th SL-RSRP threshold among the N SL-RSRP thresholds, where k is a positive integer greater than or equal to 1 and less than or equal to N.

In some optional implementations, the determining unit 1001 is configured to increase the first SL-RSRP threshold by N−1 different values respectively, to obtain N SL-RSRP thresholds including the first SL-RSRP threshold.

In some optional implementations, the determining unit 1001 is configured to determine, based on N decoding success rates, N SL-RSRP thresholds corresponding to the N decoding success rates.

In some optional implementations, the determining unit 1001 is further configured to determine the N decoding success rates based on network configuration, pre-configuration, or indication information sent by the second terminal.

In some optional implementations, the determining unit 1001 is configured to determine the N SL-RSRP thresholds corresponding to the N decoding success rates based on at least one of a decoding capability of the first terminal or an SL-RSRP of the second terminal measured by the first terminal.

In some optional implementations, any one resource in the first resource set is represented as R(x, y), where x and y indicate a time-domain position and a frequency-domain position of the resource respectively. The first exclusion operation includes following operation.

in response to the first terminal sending data in a slot a within a sensing window and not performing sensing in the slot a, the first terminal determines whether a slot a+q*Prx1g overlaps with a resource R(x, y+j*Ptx1g); and in response to the slot a+q*Prx1g overlapping with the resource R(x, y+j*Ptx1g), the first terminal performs resource exclusion R(x, y) from the first resource set.

Herein, j=0, 1, 2, 3 . . . C−1, and C is determined by a random value generated by the first terminal; Ptx1g is a number of logical slots converted from Ptx, and Ptx is a resource reservation period of the first terminal; Prx1g is a number of logical slots converted from Prx, and Prx is any one allowed resource reservation period in the resource pool; q=1, 2, 3 . . . Q, and if Prx<Tsca1 and n−m≤Prx1g, Q=[Tsca1/Prx], otherwise, Q=1, where Tsca1 is a value in milliseconds that is converted from T2, T2 is an upper limit of the resource selection window, n is a slot number corresponding to a time-domain position where the first terminal triggers resource selection or resource reselection, and m is a slot number corresponding to a time-domain position where the first terminal senses PSCCH.

In some optional implementations, any one resource in the first resource set is represented as R(x, y), where x and y indicate a time-domain position and a frequency-domain position of the resource respectively. The second exclusion operation includes following operation.

In response to the first terminal having reserved resources or selected resources in a slot b, the first terminal determines whether a slot b+q*Prx1g overlaps with a resource R(x, y+j*Ptx1g); and in response to the slot b+q*Prx1g overlaps with a resource R(x, y+j*Ptx1g), the first terminal performs resource exclusion R(x, y) from the first resource set Herein, j=0, 1, 2, 3 . . . C−1, and C is determined by a random value generated by the first terminal; Ptx1g is a number of logical slots converted from Ptx, and Ptx is a resource reservation period of the first terminal; Prx1g is a number of logical slots converted from Prx, and Prx is any one allowed resource reservation period in the resource pool; q=1, 2, 3 . . . Q, and if Prx<Tsca1 and n−m≤Prx1g, Q=[Tsca1/Prx], otherwise, Q=1, where Tsca1 is a value in milliseconds that is converted from T2, T2 is an upper limit of the resource selection window, n is a slot number corresponding to a time-domain position where the first terminal triggers resource selection or resource reselection, and m is a slot number corresponding to a time-domain position where the first terminal senses PSCCH.

In some optional implementations, any one resource in the first resource set is represented as R(x, y), where x and y indicate a time-domain position and a frequency-domain position of the resource respectively. The third exclusion operation includes following operation.

In response to the first terminal sensing SCI sent by a terminal, other than the second terminal, on a v-th frequency domain resource E(v, m) in a slot m within the sensing window, by the first terminal measures an SL-RSRP of a PSCCH carrying the SCI or an SL-RSRP of a PSSCH scheduled by the SCI.

In response to the measured SL-RSRP being greater than the SL-RSRP threshold and reserved resources between TBs being activated in the resource pool, the first terminal assumes that the SCI has been received in a slot m+q*Prx1g, where Prx1g is a number of logical slots converted from Prx, and Prx is a resource reservation period indicated in the SCI transmitted in the PSCCH sensed by the first terminal; q=1, 2, 3 . . . Q, and if Prx<Tsca1 and n–m≤Prx1g, Q=[Tsca1/Prx], otherwise, Q=1, where Tsca1 is a value in milliseconds that is converted from T2, T2 is an upper limit of the resource selection window, n is a slot number corresponding to a time-domain position where the first terminal triggers resource selection or resource reselection, and m is a slot number corresponding to a time-domain position where the first terminal senses PSCCH.

The first terminal determines whether Q pieces of SCI assumed to have been received include at least one piece of SCI indicating a resource that overlaps with the resource R(x, y+j*Ptx1g), in response to the Q pieces of SCI including the at least one piece of SCI, the first terminal excludes the resource R(x, y) from the first resource set, where j=0, 1, 2, 3 . . . C–1, and C is determined by a random value generated by the first terminal; Ptx1g is a number of logical slots converted from the Ptx, and Ptx is a resource reservation period of the second terminal.

In some optional implementations, the resource reservation period of the second terminal is indicated by the second terminal to the first terminal.

In some optional implementations, the determining unit 1001 is further configured to determine that the received SCI is from a terminal other than the second terminal in response to an 8-bit source Identity (ID) carried in second-stage SCI associated with the SCI received by the first terminal being different from a lowest 8 bits of a source ID of the second terminal.

In some optional implementations, the lowest 8 bits of the source ID of the second terminal are indicated by the second terminal to the first terminal.

In some optional implementations, the indicating unit 1003 is configured to send a bitmap to the second terminal, where the bitmap is used for indicating at least one of the second resource set or the third resource set.

In some optional implementations, one or more bits at one or more particular locations in the bitmap correspond to a particular resource in the first resource set, and values of the one or more bits are used for indicating whether the resource corresponding to the one or more bits belongs to the second resource set, belongs to a particular subset of the second resource set or belongs to the third resource set.

In some optional implementations, a length of the bitmap is associated with a total number of resources contained in the first resource set and a total number of sets indicated by the first terminal to the second terminal, the total number of the sets including a number of subsets contained in the second resource set and a number of the third resource sets.

In some optional implementations, the length of the bitmap is L=G*CEIL(log 2(H–1)), where G is the total number of resources contained in the first resource set, and H is the total number of sets indicated by the first terminal to the second terminal.

Those skilled in the art will appreciate that the description of the device for determining a reference resource of the embodiments of the present disclosure may be understood with reference to the description of the method for determining a reference resource of the embodiments of the present disclosure.

Figure 11:
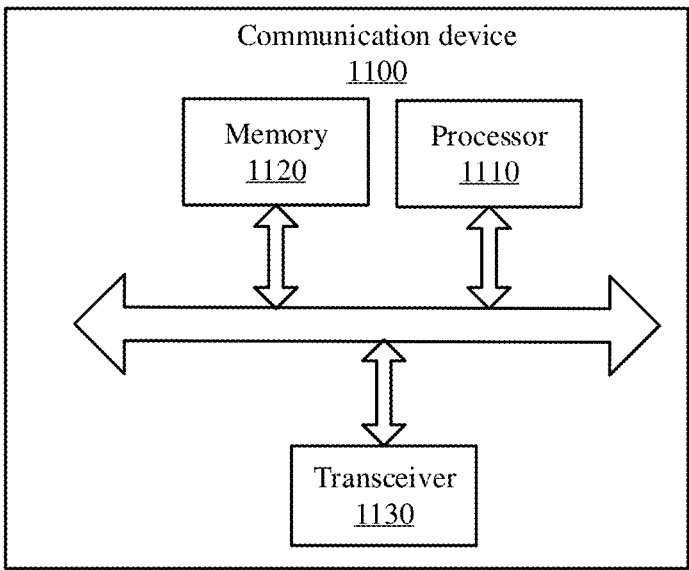
FIG. 11 is a schematic structural diagram of a communication device according to an embodiment of the present disclosure.

FIG. 11 is a schematic structural diagram of a communication device 1100 according to an embodiment of the present disclosure. The communication device may be a terminal, and the communication device 1100 shown in FIG. 11 includes a processor 1110. The processor 1110 may invoke and run a computer program from a memory to implement the method in the embodiments of the present disclosure.

Optionally, as shown in FIG. 11, the communication device 1100 may also include a memory 1120. The processor 1110 may invoke and run a computer program from the memory 1120 to implement the method in the embodiments of the present disclosure.

The memory 1120 may be a separate device independent of the processor 1110 or may be integrated in the processor 1110.

Optionally, as shown in FIG. 11, the communication device 1100 may also include a transceiver 1130. The processor 1110 may control the transceiver 1130 to communicate with other devices, in particular, to send information or data to other devices, or receive information or data sent by other devices.

The transceiver 1130 may include a transmitter and a receiver. The transceiver 1130 may further include an antenna(s), the number of which may be one or more.

Optionally, the communication device 1100 may be specifically a mobile terminal/terminal of the embodiments of the present disclosure, and the communication device 1100 may implement the corresponding process realized by the network device in each method of the embodiments of the present disclosure. For the sake of simplicity, it will not be elaborated herein.

Figure 12:
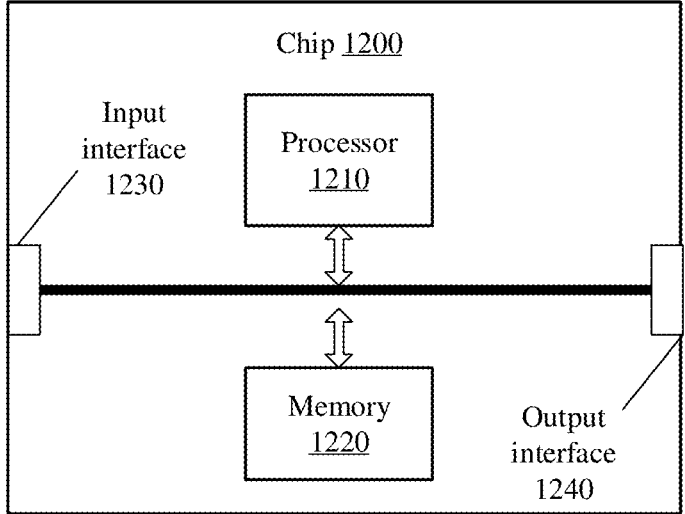
FIG. 12 is a schematic structural diagram of a chip according to an embodiment of the present disclosure.

FIG. 12 is a schematic structural diagram of a chip according to an embodiment of the present disclosure. The chip 1200 shown in FIG. 12 includes a processor 1210, and the processor 1210 can invoke and run computer programs from memory to implement the method in the embodiments of the disclosure.

Optionally, as shown in FIG. 12, the chip 1200 may also include a memory 1220. The processor 1210 can invoke and run the computer program from memory 1220 to implement the method in the embodiments of the disclosure.

The memory 1220 may be a separate device independent of or integrated into the processor 1210.

Optionally, the chip 1200 may also include an input interface 1230. The processor 1210 may control the input interface 1230 to communicate with other devices or chips, and in particular may obtain information or data sent by other devices or chips.

Optionally, the chip 1200 may also include an output interface 1240. The processor 1210 may control the output interface 1240 to communicate with other devices or chips, and in particular may output information or data to other devices or chips.

In order to implement the corresponding flow realized by the mobile terminal/terminal in the respective methods of the embodiment of the present disclosure, it will not be repeated here for the sake of brevity.

It should be understood that the chips mentioned in the embodiments of the present disclosure can also be referred to as system level chips, system chips, chip systems or on-chip system chips, etc.

It is to be understood that the processor of the embodiment of the present disclosure may be an integrated circuit chip with signal processing capability. In the implementation process, each step of the above method embodiment can be completed by the instruction in the form of integrated logic circuit of hardware or software in the processor. The above processors can be general purpose processors, digital signal processors (DSPS), application specific integrated circuits (ASICs), field programmable gate arrays (FPGAs) or other programmable logic devices, discrete gate or transistor logic devices, and discrete hardware components. The disclosed methods, steps and logic block diagrams in the embodiments of the present disclosure can be implemented or performed. The general-purpose processor may be a microprocessor or the processor may be any conventional processor or the like. The steps of the method disclosed in connection with the embodiment of the present disclosure can be directly embodied in the execution completion of the hardware decoding processor, or by the combination of the hardware and software modules in the decoding processor. The software module can be located in random memory, flash memory, read-only memory, programmable read-only memory or electrically erasable programmable memory, register and other mature storage media in the art. The storage medium is located in the memory, and the processor reads the information in the memory and completes the steps of the above method in combination with its hardware.

It is to be understood that the memory in the embodiments of the present disclosure may be volatile memory or non-volatile memory, or may include both volatile and non-volatile memory. The nonvolatile memory can be read-only memory (ROM), programmable ROM (PROM), erasable Prom (EPROM), electrically erasable EPROM (EEPROM) or flash memory. Volatile memory can be random access memory (RAM), which is used as an external cache. Many forms of RAM are available, such as static RAM (SRAM), dynamic RAM (DRAM), synchronous DRAM (SDRAM), double data rate SDRAM (DDR SDRAM, enhanced SDRAM (ESDRAM), synchlink DRAM (SLDRAM) and direct Rambus RAM (DR RAM). It is to be noted that the memory of the systems and methods described herein is intended to include, but is not limited to, these and any other suitable types of memory.

It is to be understood that the above described memory is exemplary but not restrictive. For example, the memory in the embodiment of the present disclosure can also be static RAM (SRAM), dynamic RAM (DRAM), synchronous dynamic random access memory (synchronous DRAM (SDRAM), double data rate SDRAM (DDR SDRAM), enhanced SDRAM (ESDRAM), synchronous link DRAM (SLDRAM), direct RAM (DR RAM), etc. That is to say, the memory in the embodiments of the present disclosure is intended to include, but not limited to, these and any other suitable types of memory.

The embodiments of the present disclosure also provide a computer-readable storage medium for storing computer programs.

Optionally, the computer-readable storage medium can be applied to the network device in the embodiments of the present disclosure, and the computer program enables the computer to perform the corresponding processes implemented by the network device in the various methods of the embodiment of the present disclosure. For the sake of brevity, it will not be repeated here.

Optionally, the computer-readable storage medium can be applied to the mobile terminal/UE in the embodiment of the present disclosure, and the computer program enables the computer to perform the corresponding processes implemented by the mobile terminal/terminal in the various methods of the embodiment of the present disclosure. For the sake of brevity, it will not be repeated here.

The embodiments of the present disclosure also provide a computer program product, including a computer program instruction.

Optionally, the computer program product can be applied to the network device in the embodiments of the present disclosure, and the computer program instruction enables the computer to perform the corresponding processes implemented by the network device in the various methods of the embodiment of the disclosure. For the sake of brevity, it will not be repeated herein.

Optionally, the computer program product can be applied to the mobile terminal/UE in the embodiments of the present disclosure, and the computer program instruction enables the computer to perform the corresponding process implemented by the mobile terminal/terminal in the various methods of the embodiment of the disclosure, for the sake of brevity, it will not be repeated here.

The embodiments of the present disclosure also provide a computer program.

Optionally, the computer program can be applied to the network device in the embodiments of the present disclosure. When the computer program runs on the computer, the computer performs the corresponding process realized by the network device in each method of the embodiment of the disclosure. For the sake of brevity, it will not be described herein.

Optionally, the computer program can be applied to the mobile terminal/UE in the embodiments of the present disclosure. When the computer program runs on the computer, the computer performs the corresponding process realized by the mobile terminal/terminal in the various methods of the embodiment of the disclosure. For the sake of brevity, it will not be elaborated here.

Those of ordinary skill in the art may realize that the unit and algorithm steps of each example described in combination with the disclosed embodiments herein can be realized by the combination of electronic hardware, or computer software and electronic hardware. Whether these functions are performed in hardware or software depends on the specific application and design constraints of the technical solution. A professional technician may use different methods to implement the described functions for each specific application, but such implementation shall not be considered beyond the scope of the present disclosure.

Those of ordinary skill in the art will clearly appreciate that, for convenience and conciseness of the description, the specific operating processes of the above-described systems, devices and units may refer to the corresponding processes in the aforementioned method embodiments, which will not be repeated herein.

In some embodiments of the present disclosure, it is to be understood that the disclosed system, device and method may be implemented in another manner. For example, the device embodiments described above is only schematic, and for example, division of the units is only logic function division, and other division manners may be adopted during practical implementation. For example, multiple units or components may be combined or integrated into another system, or some characteristics may be neglected or not performed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the scheme of the embodiments according to a practical requirement.

In addition, each functional unit in each embodiment of the present disclosure may be integrated into a processing unit, each unit may also physically exist independently, and two or more than two units may also be integrated into a unit.

When the function is implemented in form of software functional unit and sold or used as an independent product, the function may also be stored in a computer-readable storage medium. Based on such an understanding, the technical scheme of the present disclosure substantially or parts making contributions to the conventional art or part of the technical scheme may be embodied in form of software product, and the computer software product is stored in a storage medium, including multiple instructions configured to enable a computer device (which may be a personal computer, a server, a network device or the like) to perform all or part of the operations of the method in each embodiment of the present disclosure. The abovementioned storage medium includes: various media capable of storing program codes such as a U disk, a mobile hard disk, a ROM, a RAM, a magnetic disk or an optical disk.

The above is only the specific implementations of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

The invention claimed is:

1. A method for determining a reference resource, comprising:

determining, by a first terminal, a resource pool where a reference resource set is located, and determining, in a resource selection window, a first resource set belonging to the resource pool;

excluding, by the first terminal, resources from the first resource set based on detected Sidelink Control Information (SCI) and a measured Sidelink Reference Signal Received Power (SL-RSRP) to obtain a second resource set, wherein the second resource set is a resource set adaptable to be used by a second terminal; and indicating, by the first terminal, the second resource set to the second terminal, wherein the method further comprises:

determining, by the first terminal, at least one SL-RSRP threshold, wherein the at least one SL-RSRP threshold is used by the first terminal to exclude the resources, wherein determining, by the first terminal, the at least one SL-RSRP threshold comprises:

determining, by the first terminal, a first SL-RSRP threshold based on a first parameter and a second parameter, wherein the first parameter is a priority of data to be sent by the second terminal, and the second parameter is a priority indicated in SCI received by the first terminal, wherein excluding, by the first terminal, the resources from the first resource set based on the detected SCI and the measured SL-RSRP to obtain the second resource set comprises:

a first step that the first terminal performs a first exclusion operation on the first resource set;

a second step that the first terminal performs a second exclusion operation on the first resource set; and a third step that the first terminal performs a third exclusion operation on the first resource set based on the first SL-RSRP threshold, the detected SCI and the measured SL-RSRP, wherein after the first step, the second step and the third step are performed, a set of remaining resources is a second resource set.

2. The method of claim 1, wherein determining, by the first terminal, the first SL-RSRP threshold based on the first parameter and the second parameter comprises:

determining, by the first terminal based on the first parameter and the second parameter, an SL-RSRP threshold corresponding to the first parameter and the second parameter from an SL-RSRP threshold list as the first SL-RSRP threshold.

3. The method of claim 2, wherein the SL-RSRP threshold list is configured by a network or pre-configured.

4. The method of claim 1, wherein any one resource in the first resource set is represented as $R(x, y)$, where x and y indicate a time-domain position and a frequency-domain position of the resource respectively, and the second exclusion operation comprises:

in response to the first terminal having reserved resources or selected resources in a slot b, determining, by the first terminal, whether a slot $b+q*Prxlg$ overlaps with a resource $R(x, y+j*Ptxlg)$; and in response to the slot $b+q*Prxlg$ overlaps with the resource $R(x, y+j*Ptxlg)$, excluding, by the first terminal, the resource $R(x, y)$ from the first resource set, wherein $j=0, 1, 2, 3 \ldots C-1$, and C is determined by a random value generated by the first terminal; Ptxlg is a number of logical slots converted from Ptx, and Ptx is a resource reservation period of the first terminal; Prxlg is a number of logical slots converted from Prx, and Prx is any one allowed resource reservation period in the resource pool; $q=1, 2, 3 \ldots Q$, and if $Prx<Tscal$ and $n-m \leq Prxlg$, $Q=[Tscal/Prx]$, otherwise, $Q=1$, where Tscal is a value in milliseconds that is converted from T2, T2 is an upper limit of the resource selection window, n is a slot number corresponding to a time-domain position where the first terminal triggers resource selection or resource reselection, and m is a slot number corresponding to a time-domain position where the first terminal senses Physical Sidelink Control Channel (PSCCH).

5. The method of claim 1, wherein any one resource in the first resource set is represented as $R(x, y)$, where x and y indicate a time-domain position and a frequency-domain position of the resource respectively, and the third exclusion operation comprises:

in response to the first terminal sensing SCI sent by a terminal, other than the second terminal, on a v-th frequency domain resource $E(v, m)$ in a slot m within the sensing window, measuring, by the first terminal, an SL-RSRP of a Physical Sidelink Control Channel (PSCCH) carrying the SCI or an SL-RSRP of a PSSCH scheduled by the SCI;

in response to a measured SL-RSRP being greater than the SL-RSRP threshold and reserved resources between Transport Blocks (TBs) being activated in the resource pool, assuming, by the first terminal, that the SCI has been received in a slot $m+q*Prxlg$, wherein Prxlg is a number of logical slots converted from Prx, and Prx is a resource reservation period indicated in the SCI transmitted in the PSCCH sensed by the first terminal; q=1, 2, 3 . . . Q, and if Prx<Tscal and n-m≤Prxlg, Q=[Tscal/Prx], otherwise, Q=1, where Tscal is a value in milliseconds that is converted from T2, T2 is an upper limit of the resource selection window, n is a slot number corresponding to a time-domain position where the first terminal triggers resource selection or resource reselection, and m is a slot number corresponding to a time-domain position where the first terminal senses PSCCH; and determining, by the first terminal, whether Q pieces of SCI assumed to have been received comprise at least one piece of SCI indicating a resource that overlaps with the resource R(x, y+j*Ptxlg), in response to the Q pieces of SCI comprising the at least one piece of SCI, excluding, by the first terminal, the resource R(x, y) from the first resource set, wherein j=0, 1, 2, 3 . . . C-1, and C is determined by a random value generated by the first terminal; Ptxlg is a number of logical slots converted from the Ptx, and Ptx is a resource reservation period of the second terminal.

6. The method of claim 5, wherein the resource reservation period of the second terminal is indicated by the second terminal to the first terminal.

7. A first terminal, comprising:

a processor, and a memory configured to store computer instructions executable by the processor, wherein the processor is configured to perform operations of:

determining a resource pool where a reference resource set is located, and determine, in a resource selection window, a first resource set belonging to the resource pool;

excluding resources from the first resource set based on detected Sidelink Control Information (SCI) and a measured Sidelink Reference Signal Received Power (SL-RSRP) to obtain a second resource set, wherein the second resource set is a resource set adaptable to be used by a second terminal; and indicating the second resource set to the second terminal, wherein the processor is further configured to perform an operation of:

determining at least one SL-RSRP threshold, wherein the at least one SL-RSRP threshold is used by the first terminal to exclude the resources, wherein determining the at least one SL-RSRP threshold comprises:

determining a first SL-RSRP threshold based on a first parameter and a second parameter, wherein the first parameter is a priority of data to be sent by the second terminal, and the second parameter is a priority indicated in SCI received by the first terminal, wherein excluding the resources from the first resource set based on the detected SCI and the measured SL-RSRP to obtain the second resource set comprises:

a first step that the first terminal performs a first exclusion operation on the first resource set;

a second step that the first terminal performs a second exclusion operation on the first resource set; and a third step that the first terminal performs a third exclusion operation on the first resource set based on the first SL-RSRP threshold, the detected SCI and the measured SL-RSRP, wherein after the first step, the second step and the third step are performed, a set of remaining resources is a second resource set.

8. The first terminal of claim 7, wherein determining the first SL-RSRP threshold based on the first parameter and the second parameter comprises:

determining, based on the first parameter and the second parameter, an SL-RSRP threshold corresponding to the first parameter and the second parameter from an SL-RSRP threshold list as the first SL-RSRP threshold.

9. The first terminal of claim 8, wherein the SL-RSRP threshold list is configured by a network or pre-configured.

10. The first terminal of claim 7, wherein any one resource in the first resource set is represented as R(x, y), where x and y indicate a time-domain position and a frequency-domain position of the resource respectively, and the second exclusion operation comprises:

in response to the first terminal having reserved resources or selected resources in a slot b, determining, by the first terminal, whether a slot b+q*Prxlg overlaps with a resource R(x, y+j*Ptxlg); and in response to the slot b+q*Prxlg overlaps with the resource R(x, y+j*Ptxlg), excluding, by the first terminal, the resource R(x, y) from the first resource set, wherein j=0, 1, 2, 3 . . . C-1, and C is determined by a random value generated by the first terminal; Ptxlg is a number of logical slots converted from Ptx, and Ptx is a resource reservation period of the first terminal; Prxlg is a number of logical slots converted from Prx, and Prx is any one allowed resource reservation period in the resource pool; q=1, 2, 3 . . . Q, and if Prx<Tscal and n-m≤Prxlg, Q=[Tscal/Prx], otherwise, Q=1, where Tscal is a value in milliseconds that is converted from T2, T2 is an upper limit of the resource selection window, n is a slot number corresponding to a time-domain position where the first terminal triggers resource selection or resource reselection, and m is a slot number corresponding to a time-domain position where the first terminal senses Physical Sidelink Control Channel (PSCCH).

11. The first terminal of claim 7, wherein any one resource in the first resource set is represented as R(x, y), where x and y indicate a time-domain position and a frequency-domain position of the resource respectively, and the third exclusion operation comprises:

in response to the first terminal sensing SCI sent by a terminal, other than the second terminal, on a v-th frequency domain resource E (v, m) in a slot m within the sensing window, measuring, by the first terminal, an SL-RSRP of a Physical Sidelink Control Channel (PSCCH) carrying the SCI or an SL-RSRP of a PSSCH scheduled by the SCI;

in response to the measured SL-RSRP being greater than the SL-RSRP threshold and reserved resources between Transport Blocks (TBs) being activated in the resource pool, assuming, by the first terminal, that the SCI has been received in a slot m+q*Prxlg, wherein Prxlg is a number of logical slots converted from Prx, and Prx is a resource reservation period indicated in the SCI transmitted in the PSCCH sensed by the first terminal; q=1, 2, 3 . . . Q, and if Prx<Tscal and n-m_Prxlg, Q=[Tscal/Prx], otherwise, Q=1, where Tscal is a value in milliseconds that is converted from T2, T2 is an upper limit of the resource selection window, n is a slot number corresponding to a time-domain position where the first terminal triggers resource selection or resource reselection, and m is a slot number corresponding to a time-domain position where the first terminal senses PSCCH; and determining, by the first terminal, whether Q pieces of SCI assumed to have been received comprise at least one piece of SCI indicating a resource that overlaps with the resource $R(x, y+j*Ptxlg)$, in response to the Q pieces of SCI comprising the at least one piece of SCI, excluding, by the first terminal, the resource $R(x, y)$ from the first resource set, wherein $j=0, 1, 2, 3 \ldots C-1$, and C is determined by a random value generated by the first terminal; Ptxlg is a number of logical slots converted from the Ptx, and Ptx is a resource reservation period of the second terminal.

12. The first terminal of claim 11, wherein the resource reservation period of the second terminal is indicated by the second terminal to the first terminal.

13. A non-transitory computer-readable storage medium having stored thereon computer-executable instructions that, when executed by a processor of a first terminal, cause the first terminal to perform operations of:

determining a resource pool where a reference resource set is located, and determining, in a resource selection window, a first resource set belonging to the resource pool;

excluding resources from the first resource set based on detected Sidelink Control Information (SCI) and a measured Sidelink Reference Signal Received Power (SL-RSRP) to obtain a second resource set, wherein the second resource set is a resource set adaptable to be used by a second terminal; and indicating the second resource set to the second terminal, wherein the first terminal is caused to further perform an operation of:

determining at least one SL-RSRP threshold, wherein the at least one SL-RSRP threshold is used by the first terminal to exclude the resources, wherein determining the at least one SL-RSRP threshold comprises:

determining a first SL-RSRP threshold based on a first parameter and a second parameter, wherein the first parameter is a priority of data to be sent by the second terminal, and the second parameter is a priority indicated in SCI received by the first terminal, wherein excluding the resources from the first resource set based on the detected SCI and the measured SL-RSRP to obtain the second resource set comprises:

a first step that the first terminal performs a first exclusion operation on the first resource set;

a second step that the first terminal performs a second exclusion operation on the first resource set; and a third step that the first terminal performs a third exclusion operation on the first resource set based on the first SL-RSRP threshold, the detected SCI and the measured SL-RSRP, wherein after the first step, the second step and the third step are performed, a set of remaining resources is a second resource set.

14. The non-transitory computer-readable storage medium of claim 13, wherein determining the first SL-RSRP threshold based on the first parameter and the second parameter comprises:

determining, based on the first parameter and the second parameter, an SL-RSRP threshold corresponding to the first parameter and the second parameter from an SL-RSRP threshold list as the first SL-RSRP threshold.

15. The non-transitory computer-readable storage medium of claim 14, wherein the SL-RSRP threshold list is configured by a network or pre-configured.

16. The non-transitory computer-readable storage medium of claim 13, wherein any one resource in the first resource set is represented as $R(x, y)$, where x and y indicate a time-domain position and a frequency-domain position of the resource respectively, and the second exclusion operation comprises:

in response to the first terminal having reserved resources or selected resources in a slot b, determining, by the first terminal, whether a slot $b+q*Prxlg$ overlaps with a resource $R(x, y+j*Ptxlg)$; and in response to the slot $b+q*Prxlg$ overlaps with the resource $R(x, y+j*Ptxlg)$, excluding, by the first terminal, the resource $R(x, y)$ from the first resource set, wherein $j=0, 1, 2, 3 \ldots C-1$, and C is determined by a random value generated by the first terminal; Ptxlg is a number of logical slots converted from Ptx, and Ptx is a resource reservation period of the first terminal; Prxlg is a number of logical slots converted from Prx, and Prx is any one allowed resource reservation period in the resource pool; $q=1, 2, 3 \ldots Q$, and if $Prx<Tscal$ and $n-m\_Prxlg$, $Q=[Tscal/Prx]$, otherwise, $Q=1$, where Tscal is a value in milliseconds that is converted from T2, T2 is an upper limit of the resource selection window, n is a slot number corresponding to a time-domain position where the first terminal triggers resource selection or resource reselection, and m is a slot number corresponding to a time-domain position where the first terminal senses Physical Sidelink Control Channel (PSCCH).

17. The non-transitory computer-readable storage medium of claim 13, wherein any one resource in the first resource set is represented as $R(x, y)$, where x and y indicate a time-domain position and a frequency-domain position of the resource respectively, and the third exclusion operation comprises:

in response to the first terminal sensing SCI sent by a terminal, other than the second terminal, on a v-th frequency domain resource $E (v, m)$ in a slot m within the sensing window, measuring, by the first terminal, an SL-RSRP of a Physical Sidelink Control Channel (PSCCH) carrying the SCI or an SL-RSRP of a PSSCH scheduled by the SCI;

in response to the measured SL-RSRP being greater than the SL-RSRP threshold and reserved resources between Transport Blocks (TBs) being activated in the resource pool, assuming, by the first terminal, that the SCI has been received in a slot $m+q*Prxlg$, wherein Prxlg is a number of logical slots converted from Prx, and Prx is a resource reservation period indicated in the SCI transmitted in the PSCCH sensed by the first terminal; $q=1, 2, 3 \ldots Q$, and if $Prx<Tscal$ and $n-m<Prxlg$, $Q=[Tscal/Prx]$, otherwise, $Q=1$, where Tscal is a value in milliseconds that is converted from T2, T2 is an upper limit of the resource selection window, n is a slot number corresponding to a time-domain position where the first terminal triggers resource selection or resource reselection, and m is a slot number corresponding to a time-domain position where the first terminal senses PSCCH; and determining, by the first terminal, whether Q pieces of SCI assumed to have been received comprise at least one piece of SCI indicating a resource that overlaps with the resource $R(x, y+j*Ptxlg)$, in response to the Q pieces of SCI comprising the at least one piece of SCI, excluding, by the first terminal, the resource $R(x, y)$ from the first resource set, wherein $j=0, 1, 2, 3 \ldots C-1$, and C is determined by a random value generated by the first terminal; Ptxlg is a number of logical slots converted from the Ptx, and Ptx is a resource reservation period of the second terminal.

18. The non-transitory computer-readable storage medium of claim 17, wherein the resource reservation period of the second terminal is indicated by the second terminal to the first terminal.

\* \* \* \* \*